(12) United States Patent
Han et al.

(10) Patent No.: US 11,217,267 B2
(45) Date of Patent: Jan. 4, 2022

(54) ELECTRONIC DEVICE FOR IDENTIFYING LOCATION INFORMATION OF EXTERNAL DEVICE AND OPERATING METHOD THEREOF

(71) Applicant: SAMSUNG ELECTRONICS CO., LTD., Suwon-si (KR)

(72) Inventors: Changwoo Han, Suwon-si (KR); Minkyu Shin, Suwon-si (KR); Jonguk Yoo, Suwon-si (KR); Dokyun Lee, Suwon-si (KR); Kangseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/023,880

(22) Filed: Sep. 17, 2020

(65) Prior Publication Data

US 2021/0166720 A1  Jun. 3, 2021

(30) Foreign Application Priority Data

Dec. 3, 2019 (KR) .................. 10-2019-0159362

(51) Int. Cl.
*H04R 29/00* (2006.01)
*G10L 25/51* (2013.01)
*G06N 3/08* (2006.01)
*G10L 21/0272* (2013.01)
*G10L 25/30* (2013.01)

(52) U.S. Cl.
CPC ............ *G10L 25/51* (2013.01); *G06N 3/08* (2013.01); *G10L 21/0272* (2013.01); *G10L 25/30* (2013.01)

(58) Field of Classification Search
CPC ..................................... H04R 29/00
See application file for complete search history.

(56) References Cited

U.S. PATENT DOCUMENTS

| 7,952,962 | B2  | 5/2011 | Walley et al. | |
|---|---|---|---|---|
| 2005/0000543 | A1* | 1/2005 | Taylor | G05D 1/0219 134/18 |
| 2014/0116469 | A1* | 5/2014 | Kim | G05D 1/0022 134/18 |

(Continued)

FOREIGN PATENT DOCUMENTS

| JP | 2019-103073 | 6/2019 |
|---|---|---|
| KR | 10-2019-0029913 | 3/2019 |

*Primary Examiner* — Olisa Anwah
(74) *Attorney, Agent, or Firm* — Nixon & Vanderhye, P.c.

(57) ABSTRACT

A method, performed by an electronic device, of identifying location information of an external includes: obtaining map information including location information for each time interval of a mobile device based on the mobile device moving while generating noise near the external device; obtaining audio signal information about an audio signal including the noise generated by the mobile device, the audio signal being collected by a microphone of the external device; identifying, from the audio signal information, a time point at which a noise level of the noise generated by the mobile device is highest; obtaining, from the map information, location information of the mobile device corresponding to the identified time point; and identifying the location information of the external device based on the obtained location information of the mobile device.

15 Claims, 12 Drawing Sheets

(56) References Cited

U.S. PATENT DOCUMENTS

| | | | |
|---|---|---|---|
| 2016/0052133 A1* | 2/2016 | Kim | B25J 9/1692 |
| | | | 700/257 |
| 2017/0186079 A1* | 6/2017 | Kim | G06F 3/0488 |
| 2019/0045991 A1* | 2/2019 | Lee | A47L 9/14 |
| 2019/0081810 A1 | 3/2019 | Jung | |
| 2020/0127866 A1* | 4/2020 | Lee | A47L 9/2894 |
| 2020/0211538 A1* | 7/2020 | Lee | G10L 15/20 |
| 2020/0375425 A1* | 12/2020 | Kim | A47L 9/281 |
| 2020/0375427 A1* | 12/2020 | Huang | G05D 1/0221 |
| 2021/0085145 A1* | 3/2021 | Kim | A47L 11/4011 |
| 2021/0099780 A1* | 4/2021 | Lee | H04R 3/005 |
| 2021/0121035 A1* | 4/2021 | Kim | G05D 1/0219 |
| 2021/0191351 A1* | 6/2021 | Thangadorai | G16Y 10/75 |

\* cited by examiner

FIG. 8
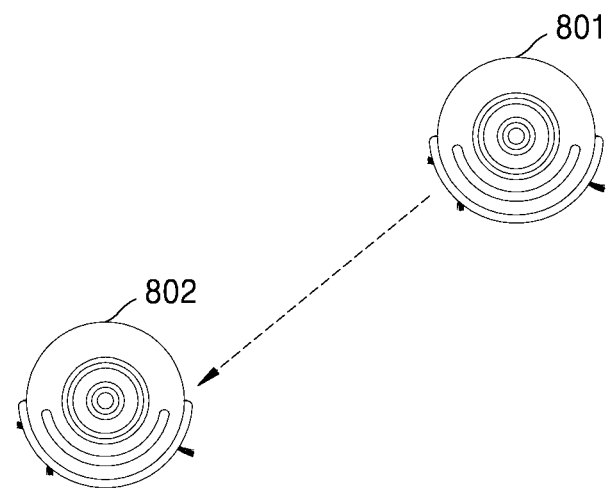
P(robot)=0.8 SPL=52dB
P(else)=0.2 SPL=40dB
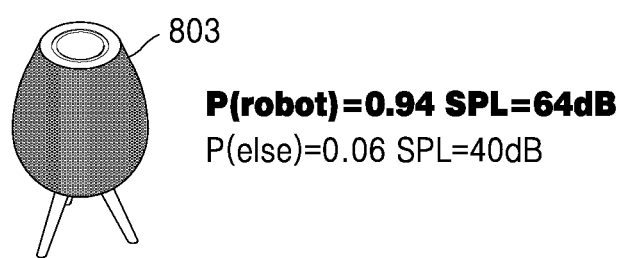
P(robot)=0.94 SPL=64dB
P(else)=0.06 SPL=40dB FIG. 9
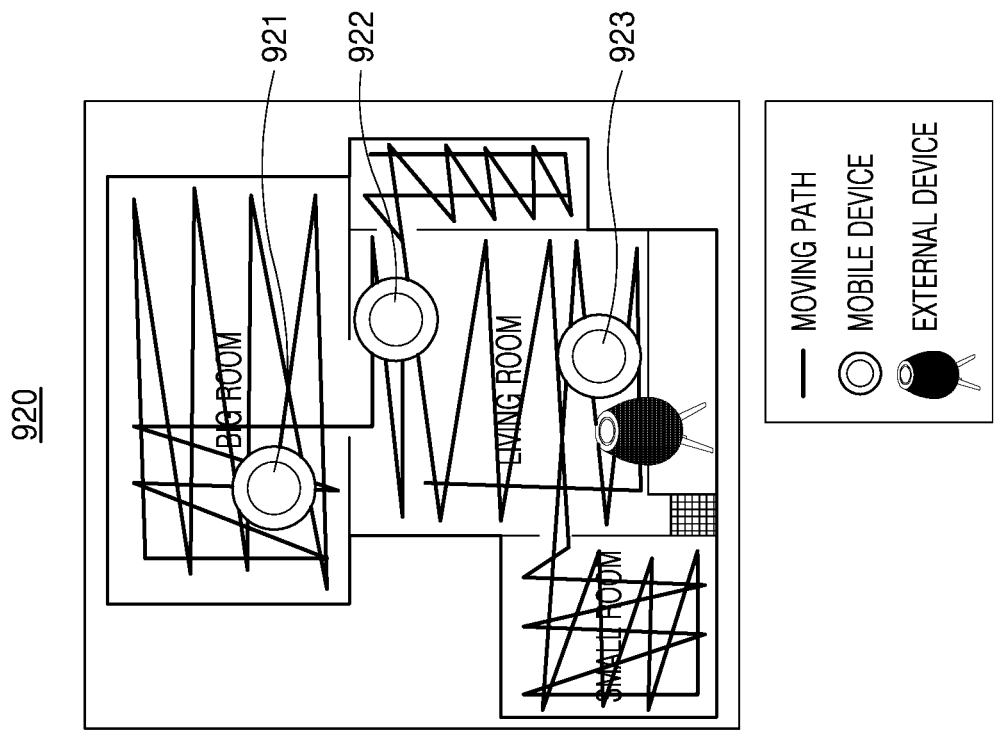
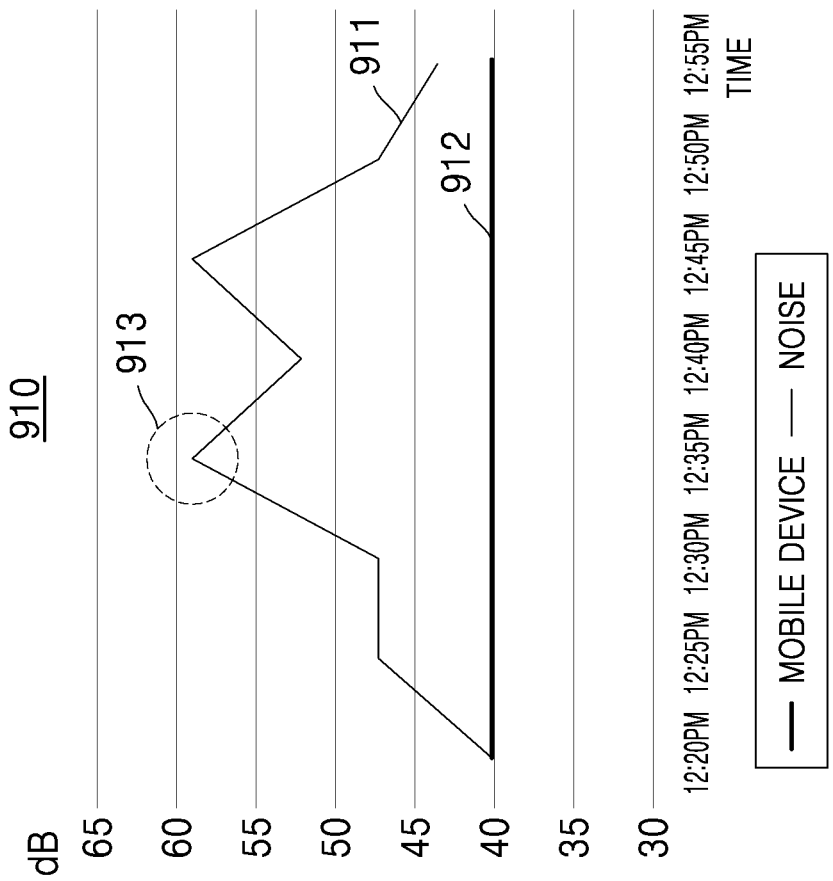

ELECTRONIC DEVICE FOR IDENTIFYING LOCATION INFORMATION OF EXTERNAL DEVICE AND OPERATING METHOD THEREOF

CROSS-REFERENCE TO RELATED APPLICATION

This application is based on and claims priority under 35 U.S.C. § 119 to Korean Patent Application No. 10-2019-0159362, filed on Dec. 3, 2019, in the Korean Intellectual Property Office, the disclosure of which is incorporated by reference herein in its entirety.

BACKGROUND

1. Field

The disclosure relates to an electronic device for identifying location information of an external device and an operating method thereof.

2. Description of Related Art

Various home appliances may be in the home. The home appliances may operate differently according to a change in lifestyle of a user or a change in a home environment. For example, operations of the home appliances may be controlled according to movement of the user or an environment of each home appliance, based on a location of each home appliance.

Therefore, various methods have been used to identify location information of the home appliances in the home.

SUMMARY

Embodiments of the disclosure provide an electronic device for identifying location information of an external device and a method of operating the external device.

Embodiments of the disclosure provide a computer-readable recording medium having recorded thereon a program for executing the method on a computer. The technical problems to be addressed are not limited to those described above, and other technical problems may be present.

Additional aspects will be set forth in part in the description which follows and, in part, will be apparent from the description.

According to an example embodiment of the disclosure, a method, performed by an electronic device, of identifying location information of an external device includes: obtaining map information including location information for each time interval of a mobile device based on the mobile device moving while generating noise near the external device; obtaining audio signal information about an audio signal including the noise generated by the mobile device, the audio signal being collected by a microphone of the external device; identifying, from the audio signal information, a time point at which a noise level of the noise generated by the mobile device is highest; obtaining, from the map information, location information of the mobile device corresponding to the identified time point; and identifying the location information of the external device based on the obtained location information of the mobile device.

According to an example embodiment of the disclosure, an electronic device for identifying location information of an external device includes: a communicator comprising communication circuitry configured to: obtain map information including location information for each time interval of a mobile device based on the mobile device moving while generating noise near the external device, and obtain audio signal information about an audio signal including the noise generated by the mobile device, the audio signal being collected by a microphone of the external device; and at least one processor configured to: identify, from the information audio signal, a time point at which a noise level of the noise generated by the mobile device is highest, obtain, from the map information, location information of the mobile device corresponding to the identified time point, and identify the location information of the external device, based on the obtained location information of the mobile device.

According to an example embodiment of the disclosure, a non-transitory computer-readable recording medium has recorded thereon a program for implementing the above method.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 8 is a diagram illustrating an example of extracting information about noise of a mobile device, according to an embodiment of the disclosure;

FIG. 9 is a diagram illustrating an example of a noise level of a mobile device, according to an embodiment of the disclosure;

DETAILED DESCRIPTION

Figure 1:
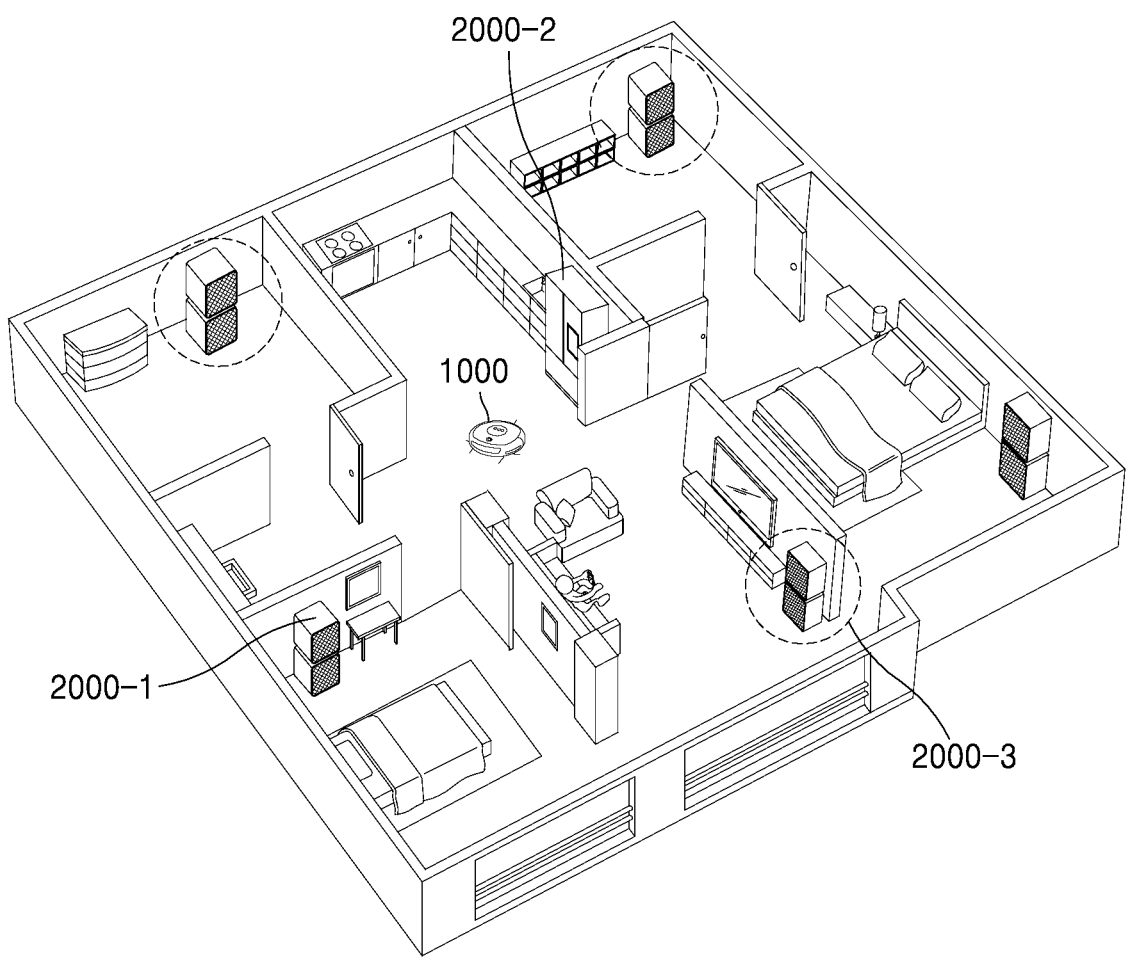
FIG. 1 is a diagram illustrating an example of identifying location information of external devices using a mobile device, according to an embodiment of the disclosure.

Hereinafter, various example embodiments of the disclosure will be described in greater detail with reference to the accompanying drawings. However, the disclosure may be implemented in various different forms and is not limited to the embodiments of the disclosure described herein. Also, in the drawings, parts irrelevant to the description may be omitted to clearly describe the disclosure, and like reference numerals designate like elements throughout the disclosure.

Throughout the disclosure, when a part is "connected" to another part, the part may not only be "directly connected" to the other part, but may also be "electrically connected" to the other part with another element in between. In addition, when a part "includes" a certain component, the part may further include another component instead of excluding the other component, unless otherwise stated.

A function related to artificial intelligence (AI) according to the disclosure operates via a processor and a memory. The processor may be configured as one or more processors. In this case, the one or more processors may be a general-purpose processor such as a central processing unit (CPU), an application processor (AP), or a digital signal processor (DSP), a dedicated graphics processor such as a graphical processing unit (GPU) or a vision processing unit (VPU), or a dedicated AI processor such as a neural processing unit (NPU). The one or more processors may control input data to be processed according to predefined operation rules or an AI model stored in the memory. Alternatively, when the one or more processors are a dedicated AI processor, the dedicated AI processor may be designed to have a hardware structure specialized for processing a particular AI model.

The predefined operation rules or AI model may be generated via a training process. The generation via the training process may refer, for example, to the predefined operation rules or AI model set to perform according to desired characteristics (or purposes) being generated by training a basic AI model using a learning algorithm that utilizes a large number of training data. The training process may be performed by a device for performing AI or a separate server and/or system. Examples of the learning algorithm may include supervised learning, unsupervised learning, semi-supervised learning, and reinforcement learning, but are not limited thereto.

The AI model may include a plurality of neural network layers. Each of the neural network layers may include a plurality of weight values, and performs neural network calculation through calculation between calculation result of a previous layer and the plurality of weight values. The plurality of weight values in each of the neural network layers may be optimized by a result of training the AI model. For example, the plurality of weight values may be refined to reduce or minimize a loss or cost value obtained by the AI model during the training process. An artificial neural network may include a deep neural network (DNN) and may be, for example, a convolutional neural network (CNN), a DNN, a recurrent neural network (RNN), a restricted Boltzmann machine (RBM), a deep belief network (DBN), a bidirectional recurrent DNN (BRDNN), or a deep Q-network (DQN), but is not limited thereto.

Hereinafter, embodiments of the disclosure will be described in detail with reference to accompanying drawings.

FIG. 1 is a diagram illustrating an example of identifying location information of external devices 2000-1, 2000-2, and 2000-3 using a mobile device 1000, according to an embodiment of the disclosure.

Referring to FIG. 1, the location information of the external devices 2000-1, 2000-2, and 2000-3 in the home may be identified when the mobile device 1000 moves.

According to an embodiment of the disclosure, the location information of the external devices 2000-1, 2000-2, and 2000-3 may be identified based on a noise level of noise generated by the mobile device 1000, which moves, the noise level being detected by each of the external devices 2000-1, 2000-2, and 2000-3. For example, a location of the mobile device 1000 when the noise level of the mobile device 1000 detected by the external devices 2000-1, 2000-2, and 2000-3 is maximal (e.g., highest) may be identified as a location of each of the external devices 2000-1, 2000-2, and 2000-3.

The location of the mobile device 1000 according to an embodiment of the disclosure may be obtained from map information including locations for each time interval of the mobile device 1000. The map information including locations for each time interval of the mobile device 1000 may be generated when the mobile device 1000 according to an embodiment of the disclosure moves while generating noise near the external devices 2000-1, 2000-2, and 2000-3. For example, the map information may include information about a path, through which the mobile device 1000 moves according to a time interval, on a map indicating a location of the mobile device 1000. In addition, the location information of the external devices 2000-1, 2000-2, and 2000-3 may indicate a location for each of the external devices 2000-1, 2000-2, and 2000-3 on the map of the map information.

For example, the map information may be generated based on information detected by a sensor (e.g., a laser distance sensor (LDS), a gyro sensor, or a global positioning system (GPS) sensor) of the mobile device 1000. The map information according to an embodiment of the disclosure may also be generated by an electronic device when the information detected by the sensor of the mobile device 1000 is transmitted to the electronic device. However, an embodiment of the disclosure is not limited thereto, and the map information of the mobile device 1000 may be generated according to various methods.

The mobile device 1000 according to an embodiment of the disclosure may move from place to place in the home and may move to a location close to each of the external devices 2000-1, 2000-2, and 2000-3. When the mobile device 1000 is closest to the external devices 2000-1, 2000-2, and 2000-3, noise of the mobile device 1000, which is detected by each of the external devices 2000-1, 2000-2, and 2000-3, may be the loudest (e.g., highest level). Thus, according to an embodiment of the disclosure, the location information of each of the external devices 2000-1, 2000-2, and 2000-3 may be identified, based on the location of the mobile device 1000 when the mobile device 1000 is closest to each of the external devices 2000-1, 2000-2, and 2000-3.

The mobile device 1000 according to an embodiment of the disclosure may be a device that may move while generating a certain level of noise near the external devices 2000-1, 2000-2, and 2000-3. In addition, the mobile device 1000 may be a device in which map information including locations for each time interval of the mobile device 1000 may be obtained when the mobile device 1000 moves.

For example, the mobile device 1000 may be a robot cleaner that generates map information including location information for each time interval of the mobile device 1000 while the mobile device 1000 moves with a certain level of noise when performing floor cleaning in the home. However, an embodiment of the disclosure is not limited thereto, and the mobile device 1000 according to an embodiment of the disclosure may be various types of movable devices.

The external devices 2000-1, 2000-2, and 2000-3 according to an embodiment of the disclosure are devices, each including a microphone that may detect noise generated by the mobile device 1000, and may be embodied in various forms. For example, the external devices 2000-1, 2000-2, and 2000-3 may include various types of Internet of Things (IoT) devices that may be in the home, such as smart TVs, smart refrigerators, smart air cleaners, smart fans, artificial intelligence speakers, smart phones, tablet personal computers (PCs), digital cameras, laptop computers, desktops, wearable devices, etc., but are not limited thereto.

According to an embodiment of the disclosure, a device for identifying the locations of the external devices 2000-1, 2000-2, and 2000-3 may be one of the external devices 2000-1, 2000-2, and 2000-3 and the mobile device 1000, based on the noise of the mobile device 1000, which is detected by the external devices 2000-1, 2000-2, and 2000-3. However, an embodiment of the disclosure is not limited thereto, an operation of identifying the locations of the external devices 2000-1, 2000-2, and 2000-3 according to an embodiment of the disclosure may be performed by another electronic device than the external devices 2000-1, 2000-2, and 2000-3 and the mobile device 1000. Hereinafter, for convenience of description, a case, in which the operation of identifying the locations of the external devices 2000-1, 2000-2, and 2000-3 is performed by another electronic device than the mobile device 1000 and the external devices 2000-1, 2000-2, and 2000-3, will be described as an example.

Figure 2:
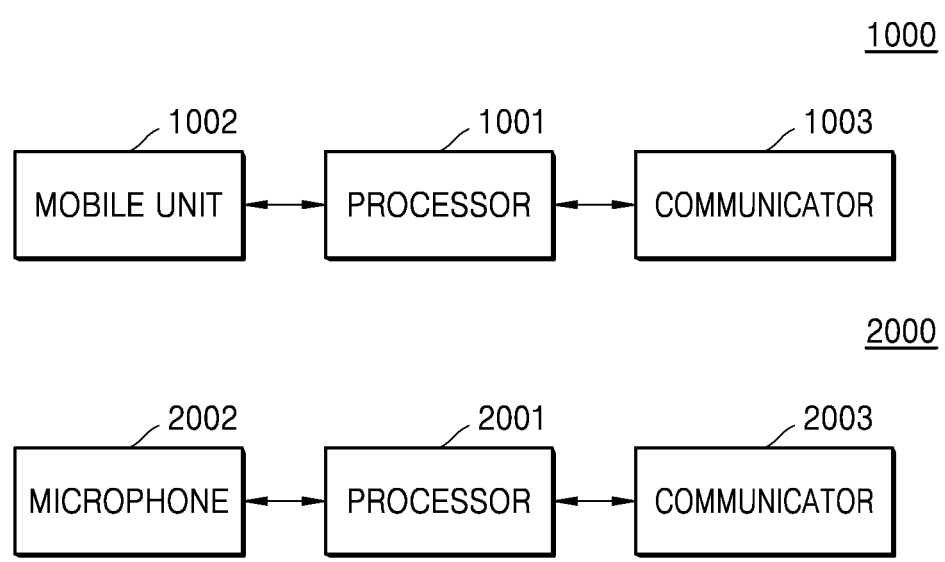
FIG. 2 is a block diagram illustrating example internal configurations of a mobile device and an external device, according to an embodiment of the disclosure.

FIG. 2 is a block diagram illustrating example internal configurations of the mobile device 1000 and an external device 2000, according to an embodiment of the disclosure.

Referring to FIG. 2, the mobile device 1000 may include a processor (e.g., including processing circuitry) 1001, a mobile unit (e.g., including driving circuitry and/or a driving motor) 1002, and a communicator (e.g., including communication circuitry) 1003. In addition, the external device 2000 may include a processor (e.g., including processing circuitry) 2001, a microphone 2002, and a communicator (e.g., including communication circuitry) 2003. However, the components shown in FIG. 2 are not all essential components of the mobile device 1000 or the external device 2000. The mobile device 1000 or the external device 2000 may include more components than the components illustrated in FIG. 2, or may include fewer components than the components illustrated in FIG. 2.

For example, the mobile device 1000 may further include a sensor (not shown) for determining a path for the mobile device 1000 to move by scanning a surrounding environment. In addition, each of the mobile device 1000 and the external device 2000 may further include a memory (not shown) storing a program for performing various operations.

The processor 1001 of the mobile device 1000 and the processor 2001 of the external device 2000 may include various processing circuitry and control overall operations of the mobile device 1000 and the external device 2000, respectively. For example, the processor 1001 and the processor 2001 may control the mobile device 1000 and the external device 2000, respectively, overall by executing programs for performing various operations.

The mobile device 1000 and the external device 2000 may include at least one processor 1001 and at least one processor 2001, respectively. For example, each of the mobile device 1000 and the external device 2000 may include various types of processors such as a central processing unit (CPU), a graphical processing unit (GPU), and a neural processing unit (NPU).

The processors 1001 and 2001 may be configured to process commands of a computer program by performing basic arithmetic, logic, and input/output calculations. The commands may be provided to the processors 1001 and 2001, or may be provided to the processors 1001 and 2001 after being received via the communicators 1003 and 2003. For example, the processors 1001 and 2001 may be configured to execute the commands according to program code stored in a recording device such as a memory (not shown).

Figure 3:
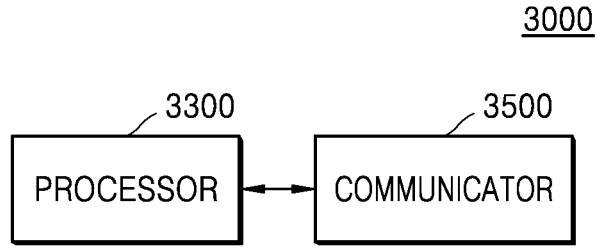
FIG. 3 is a block diagram illustrating an example internal configuration of an electronic device, according to an embodiment of the disclosure.

The processor 1001 of the mobile device 1000 according to an embodiment of the disclosure may control the mobile device 1000 such that the mobile device 1000 moves while generating noise near the external device 2000. In addition, the processor 1001 of the mobile device 1000 may generate map information including location information for each time interval of the mobile device 1000 when the mobile device 1000 moves. The generated map information may be transmitted to an electronic device 3000, which is illustrated in FIG. 3, for identifying location information of the external device 2000.

The mobile unit 1002 of the mobile device 1000 according to an embodiment of the disclosure may move the mobile device 1000. For example, the mobile unit 1002 may include a unit for moving the mobile device 1000, such as circuitry controlling a wheel or a driving motor. However, an embodiment of the disclosure is not limited thereto, and the mobile unit 1002 may include various units for moving the mobile device 1000.

The communicator 1003 of the mobile device 1000 according to an embodiment of the disclosure may include various communication circuitry and communicate with the electronic device 3000 (refer to FIG. 3) or the external device 2000. The communicator 1003 according to an embodiment of the disclosure may transmit, to the electronic device 3000 or the external device 2000, information necessary for the electronic device 3000 to identify the location information of the external device 2000. For example, the communicator 1003 may transmit, to the electronic device 3000, the map information including location information for each time interval of the mobile device 1000.

The processor 2001 of the external device 2000 according to an embodiment of the disclosure may control the microphone 2002 of the external device 2000 to detect the noise generated when the mobile device 1000 moves. In addition, the processor 2001 of the external device 2000 may transmit, to the electronic device 3000, information about the noise of the mobile device 1000, the noise being detected by the external device 2000 according to a time interval.

As described in greater detail below with reference to FIG. 6, when the location information of the external device 2000 is identified by the mobile device 1000, the processor 2001 of the external device 2000 may transmit, to the mobile device 1000, the information about the noise of the mobile device 1000, the noise being detected by the external device 2000 according to a time interval. When the location information of the external device 2000 is identified by the external device 2000, the processor 2001 of the external device 2000 may identify the location information of the external device 2000, based on the information about the noise of the mobile device 1000, without an operation of transmitting, to another external device, the information about the noise of the mobile device 1000, the noise being detected by the external device 2000 according to a time interval.

The microphone 2002 of the external device 2000 according to an embodiment of the disclosure may receive an audio signal of a surrounding environment, which includes the noise generated when the mobile device 1000 moves. The external device 2000 according to an embodiment of the disclosure may transmit the information about the noise of the mobile device 1000 to the electronic device 3000, based on the audio signal of a surrounding environment, which is received by the microphone 2002. For example, the external device 2000 may perform frequency modulation on the audio signal received by the microphone 2002, and may transmit the frequency modulated audio signal as the information about the noise of the mobile device 1000 to the electronic device 3000. As another example, the external device 2000 may extract the information about the noise of the mobile device 1000 from the audio signal received by the microphone 2002, and may transmit the extracted information as the information about the noise of the mobile device 1000 to the electronic device 3000. However, an embodiment of the disclosure is not limited thereto, and the external device 2000 may transmit, to the electronic device 3000, the information about the noise of the mobile device 1000 through various methods, the noise being obtained from the audio signal received by the microphone 2002.

The communicator 2003 of the external device 2000 according to an embodiment of the disclosure may include various communication circuitry and communicate with the electronic device 3000 or the mobile device 1000. The communicator 2003 according to an embodiment of the disclosure may transmit, to the electronic device 3000 or the mobile device 1000, information necessary for the electronic device 3000 to identify the location information of the external device 2000. For example, the communicator 2003 may transmit, to the electronic device 3000 or the mobile device 1000, the information about the noise of the mobile device 1000, the noise being obtained by the microphone 2002.

FIG. 3 is a block diagram illustrating an example internal configuration of the electronic device 3000, according to an embodiment of the disclosure.

Figure 4:
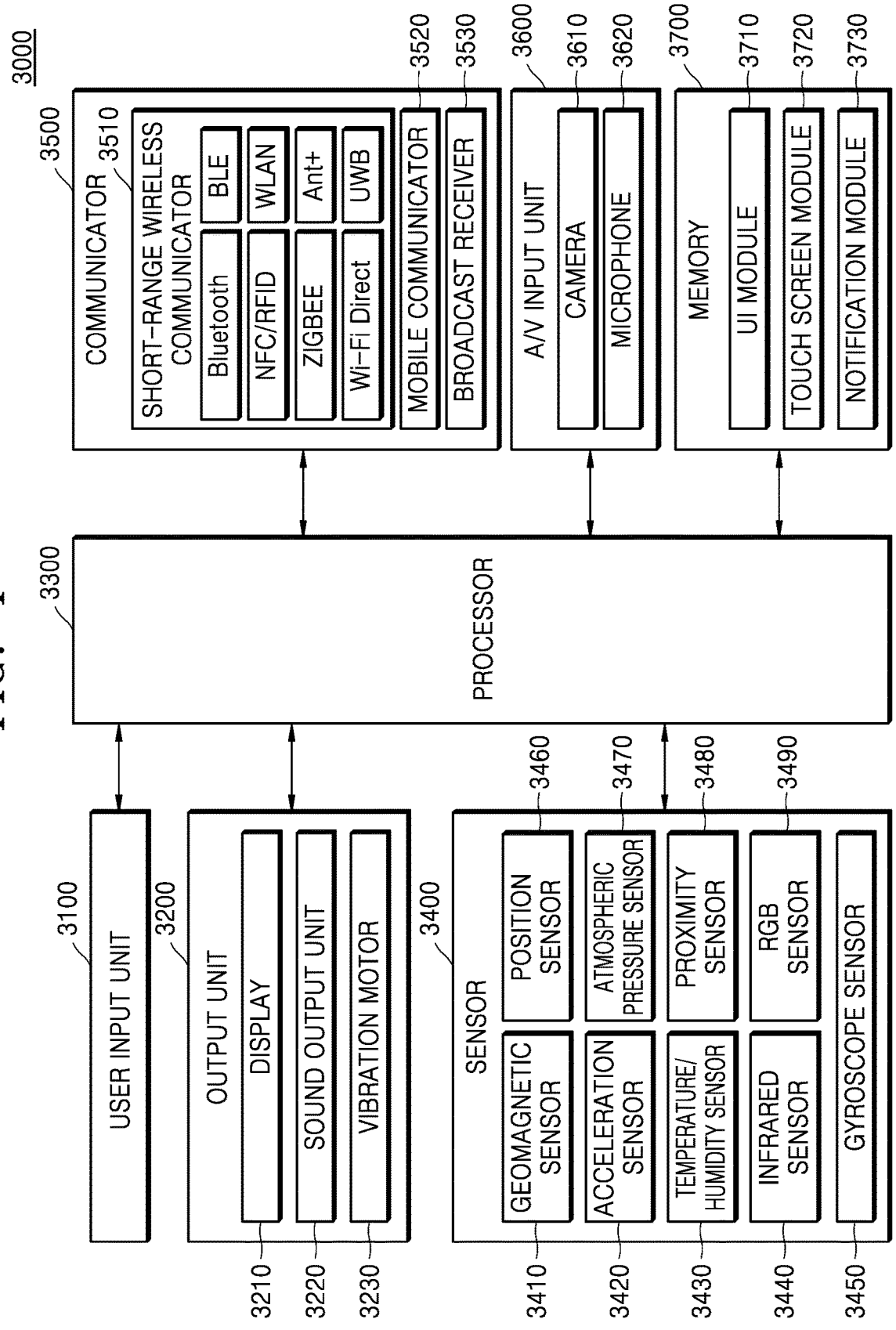
FIG. 4 is a block diagram illustrating an example internal configuration of an electronic device, according to an embodiment of the disclosure.

FIG. 4 is a block diagram illustrating an example internal configuration of the electronic device 3000, according to an embodiment of the disclosure.

Referring to FIG. 3, the electronic device 3000 may include a processor (e.g., including processing circuitry) 3300 and a communicator (e.g., including communication circuitry) 3500. However, the components shown in FIG. 3 are not all essential components of the electronic device 3000. The electronic device 3000 may include more components than the components shown in FIG. 3 or may include fewer components than the components shown in FIG. 3.

For example, as shown in FIG. 4, the electronic device 3000 according to an embodiment of the disclosure may further include a user input unit (e.g., including input circuitry) 3100, a sensor 3400, an audio/video (A/V) input unit (e.g., including A/V input circuitry) 3600, an output unit (e.g., including output circuitry) 3200, and a memory 3700, in addition to the processor 3300 and the communicator 3500.

According to an embodiment of the disclosure, the electronic device 3000 for performing an operation of identifying a location of the external device 2000 may be embodied in various forms. For example, the electronic device 3000 described herein may be a digital camera, a smart phone, a laptop computer, a tablet PC, an electronic book terminal, a digital broadcast terminal, a personal digital assistant (PDA), a portable multimedia player (PMP), a navigation device, an MP3 player, etc., but is not limited thereto. The electronic device 3000 described herein may be a wearable device of a user. Examples of the wearable device may include at least one of an accessory-type device (for example, a watch, a ring, a wrist band, an ankle band, a necklace, glasses, or contact lenses), a head-mounted device (HMD), a textile or apparel integrated device (for example, electronic clothing), a body-attachable device (for example, a skin pad), or a bio-implant type device (for example, an implantable circuit), but are not limited thereto.

The user input unit 3100 may include various circuitry to which data for controlling the electronic device 3000 is input by a user. For example, the user input unit 3100 may include a key pad, a dome switch, a touch pad (contact capacitance type, pressure resistive type, infrared detection type, surface ultrasonic wave conduction type, integral tension measuring type, piezo-effect type, or the like), a jog wheel, or a jog switch, but is not limited thereto.

According to an embodiment of the disclosure, the user input unit 3100 may receive a user input for performing an operation of identifying a location of the external device 2000. For example, when the user input unit 3100 receives the user input requesting display of the location of the external device 2000, the electronic device 3000 may perform the operation of identifying the location of the external device 2000.

The output unit 3200 may include various output circuitry and output an audio signal, a video signal, or a vibration signal, and the output unit 3200 may include a display 3210, a sound output unit (e.g., including sound output circuitry) 3220, and a vibration motor 3230.

The display 3210 displays information processed by the electronic device 3000. According to an embodiment of the disclosure, the display 3210 may display a result of identifying the location of the external device 2000.

When the display 3210 and a touch pad are configured as a touch screen by forming a layer structure, the display 3210 may also be used as an input device as well as an output device. The display 3210 may include at least one of a liquid crystal display, a thin film transistor-liquid crystal display, an organic light-emitting diode display, a flexible display, a three-dimensional (3D) display, or an electrophoretic display. Also, the electronic device 3000 may include two or more displays 3210, according to an implementation of the electronic device 3000.

The sound output unit 3220 may include various circuitry that outputs audio data received from the communicator 3500 or stored in the memory 3700. In addition, the vibration motor 3230 may output a vibration signal. The vibration motor 3230 may output a vibration signal when a touch is input to the touch screen.

The sound output unit 3220 and the vibration motor 3230 according to an embodiment of the disclosure may be used to output a result of identifying the location of the external device 2000.

The processor 3300 may include various processing circuitry and controls an overall operation of the electronic device 3000. For example, the processor 3300 may control the user input unit 3100, the output unit 3200, the sensor 3400, the communicator 3500, and the A/V input unit 3600, overall, by executing programs stored in the memory 3700.

The electronic device 3000 may include at least one processor 3300. For example, the electronic device 3000 may include various types of processors such as a CPU, a GPU, and an NPU.

The processor 3300 may be configured to process commands of a computer program by executing basic arithmetic, logic, and input/output calculations. The commands may be provided from the memory 3700 to the processor 3300 or may be provided to the processor 3300 after being received via the communicator 3500. For example, the processor 3300 may be configured to execute the commands according to program code stored in a recording device such as a memory.

The processor 3300 according to an embodiment of the disclosure may obtain audio signal information about an audio signal including noise of the mobile device 1000, the audio signal collected by a microphone of the external device 2000, and may identify, from the audio signal formation, a time point at which a noise level of the noise generated by the mobile device 1000 is highest. The processor 3300 may identify location information of the external device 2000, based on location information of the mobile device 1000, which corresponds to the identified time point. The location information of the mobile device 1000 according to an embodiment of the disclosure may be obtained from map information including location information for each time interval of the mobile device 1000, the map information being generated when the mobile device 1000 moves while generating noise near the external device 2000.

The processor 3300 according to an embodiment of the disclosure may correct the location information of the external device 2000, which is identified based on a noise level of the mobile device 1000, based on a difference between a plurality of pieces of direction information of the mobile device 1000, which are obtained at at least two time points. Each of the plurality of pieces of direction information may include information about a direction of the mobile device 1000 with respect to the external device 2000, the information about the direction being obtainable based on the noise of the mobile device 1000, which is detected by a plurality of microphones included in the external device 2000.

According to an embodiment of the disclosure, a distance between each of the plurality of microphones and the mobile device 1000 may be determined based on a phase difference between audio signals including the noise of the mobile device 1000, the noise being detected by each of the plurality of microphones. The information about a direction of the mobile device 1000 with respect to the external device 2000 may be obtained based on the determined distance. In addition, the information about a direction of the mobile device 1000 may be obtained according to a steered-response power phase transform (SRP-PHAT) method for acoustic source localization. However, an embodiment of the disclosure is not limited thereto, and the information about a direction of the mobile device 1000 may be obtained through various methods.

For example, the processor 3300 may identify at least one candidate location with respect to a location of the mobile device 1000, based on a difference between a plurality of pieces of direction information of the mobile device 1000, which are obtained at at least two time points. In addition, the processor 3300 may determine one location from among the identified at least one candidate location, based on noise levels of the mobile device 1000, which are collected by the external device 2000 at the at least two time points. For example, when the noise levels of the mobile device 1000 increase at the at least two time points, one location among the at least one candidate location may be determined based on whether a distance between each of the at least one candidate location and the mobile device 1000 becomes closer. The processor 3300 according to an embodiment of the disclosure may correct the location information of the external device 2000, based on the determined one location.

In addition, the processor 3300 according to an embodiment of the disclosure may correct the noise level of the mobile device 1000, which is collected by the external device 2000, based on information about noise characteristics of the mobile device 1000. According to an embodiment of the disclosure, when a noise level of the mobile device 1000 varies while the mobile device 1000 approaches the external device 2000, the noise level of the mobile device 1000, which is detectable by the external device 2000, may not increase as much as the mobile device 1000 approaches the external device 2000. Thus, according to an embodiment of the disclosure, when the noise characteristics are changed due to a change in an operation mode of the mobile device 1000 while the mobile device 1000 moves, the noise level collected by the external device 2000 may be corrected such that the noise level of the mobile device 1000 remains constant.

According to an embodiment of the disclosure, the processor 3300 may correct the noise level according to the noise characteristics according to the operation mode of the mobile device 1000, and may identify the location information of the external device 2000, based on the corrected noise level.

The sensor 3400 may include various sensors and detect a state of the electronic device 3000 or a state of a surrounding of the electronic device 3000, and may transmit detected information to the processor 3300.

The sensor 3400 may include, for example, at least one of a geomagnetic sensor 3410, an acceleration sensor 3420, a temperature/humidity sensor 3430, an infrared sensor 3440, a gyroscope sensor 3450, a position sensor 3460 (for example, a GPS), an atmospheric pressure sensor 3470, a proximity sensor 3480, and/or an RGB sensor 3490 (an illuminance sensor), but is not limited thereto.

The sensor 3400 according to an embodiment of the disclosure may detect information necessary for performing the operation of identifying the location information of the external device 2000. For example, the electronic device 3000 may correct the location information of the external device 2000, which is identified based on the noise level of the mobile device 1000, based on the information related to the location of the external device 2000, the information being detected by the sensor 3400. However, an embodiment of the disclosure is not limited thereto, and various types of sensing information detected by the sensor 3400 may be used according to various methods to identify the location information of the external device 2000.

The communicator 3500 may include various communication circuitry enabling the electronic device 3000 to communicate with the mobile device 1000, the external device 2000, or an external server (not shown). For example, the communicator 3500 may include a short-range wireless communicator 3510, a mobile communicator 3520, and a broadcast receiver 3530.

The short-range wireless communicator 3510 may include a Bluetooth communicator, a Bluetooth low energy (BLE) communicator, a near field communicator (NFC/RFID), a wireless local area network (WLAN) (Wi-Fi) communicator, a Zigbee communicator, an infrared data association (IrDA) communicator (not shown), a Wi-Fi direct (WFD) communicator, an ultra wideband (UWB) communicator, or an Ant+ communicator, but is not limited thereto.

The mobile communicator 3520 may transmit and/or receive a wireless signal to or from at least one of a base station, an external terminal, or a server, on a mobile communication network. Here, the wireless signal may include various types of data according to exchange of a voice call signal, an image call signal, or a text/multimedia message.

The broadcast receiver 3530 may receive a broadcast signal and/or information related to a broadcast from an external source through a broadcast channel. The broadcast channel may include a satellite channel or a terrestrial channel. According to an implementation example, the electronic device 3000 may not include the broadcast receiver 3530.

The communicator 3500 according to an embodiment of the disclosure may transmit and/or receive various types of information for identifying the location information of the external device 2000. For example, the communicator 3500 may receive, from the mobile device 1000, the map information including the location information for each time interval of the mobile device 1000. In addition, the communicator 3500 may receive, from the external device 2000, the audio signal information about the audio signal including the noise of the mobile device 1000, the audio signal being collected by the external device 2000.

The A/V input unit 3600 may include various input circuitry to which an audio signal or a video signal is input, and may include a camera 3610 and a microphone 3620. The camera 3610 may obtain a still image or an image frame of a moving image via an image sensor, in a video call mode or a photographing mode. An image captured through the image sensor may be processed via the processor 3300 or a separate image processor (not shown). The microphone 3620 may receive an external sound signal and process the external sound signal into electric voice data.

The location of the external device 2000 may be identified based on the audio signal or video signal input generated by the A/V input unit 3600, according to an embodiment of the disclosure. For example, the location of the external device 2000 may be identified based on the video signal input of a video in which the external device 2000 is photographed. However, an embodiment of the disclosure is not limited thereto, and the location of the external device 2000 may be identified based on the audio signal or video signal input via various methods.

The memory 3700 may store a program for processing and control of the processor 3300, and may store data input to or output from the electronic device 3000.

The memory 3700 according to an embodiment of the disclosure may store various information received through the communicator 1500 to identify the location information of the external device 2000. For example, the memory 3700 may store the map information of the mobile device 1000 and the audio signal information about the audio signal collected by the external device 2000. However, an embodiment of the disclosure is not limited thereto, and the memory 3700 may store various types of information necessary for identifying the location information of the external device 2000, according to an embodiment of the disclosure.

The memory 3700 may include a storage medium of at least one type from among a flash memory type, a hard disk type, a multimedia card micro type, a card type memory (for example, a secure digital (SD) or extreme digital (XD) memory), random access memory (RAM), static random access memory (SRAM), read-only memory (ROM), electrically erasable programmable read-only memory (EEPROM), programmable read-only memory (PROM), a magnetic memory, a magnetic disk, or an optical disk.

Programs stored in the memory 3700 may be classified into a plurality of modules based on functions, and for example, may be classified into a user interface (UI) module 3710, a touch screen module 3720, and a notification module 3730.

The UI module 3710 may provide a specialized UI or a graphics user interface (GUI), which interoperates with the electronic device 3000 for each application. The touch screen module 3720 may detect a touch gesture of the user on a touch screen and may transmit information about the touch gesture to the processor 3300. The touch screen module 3720 according to an embodiment of the disclosure may recognize and analyze touch code. The touch screen module 3720 may be configured as separate hardware including a controller.

Various sensors may be provided inside or near the touch screen to detect a touch or proximity touch on the touch screen. An example of a sensor for detecting the touch on the touch screen includes a tactile sensor. The tactile sensor is a sensor that detects contact of a specific object with a degree or more that is perceivable by a person. The tactile sensor may detect various types of information such as roughness of a contact surface, stiffness of a contact object, and a temperature of a contact point.

The touch gesture of the user may include tapping, touching and holding, double tapping, dragging, panning, flicking, dragging and dropping, and swiping.

The notification module 3730 may generate a signal for notifying that an event occurred in the electronic device 3000.

Figure 5:
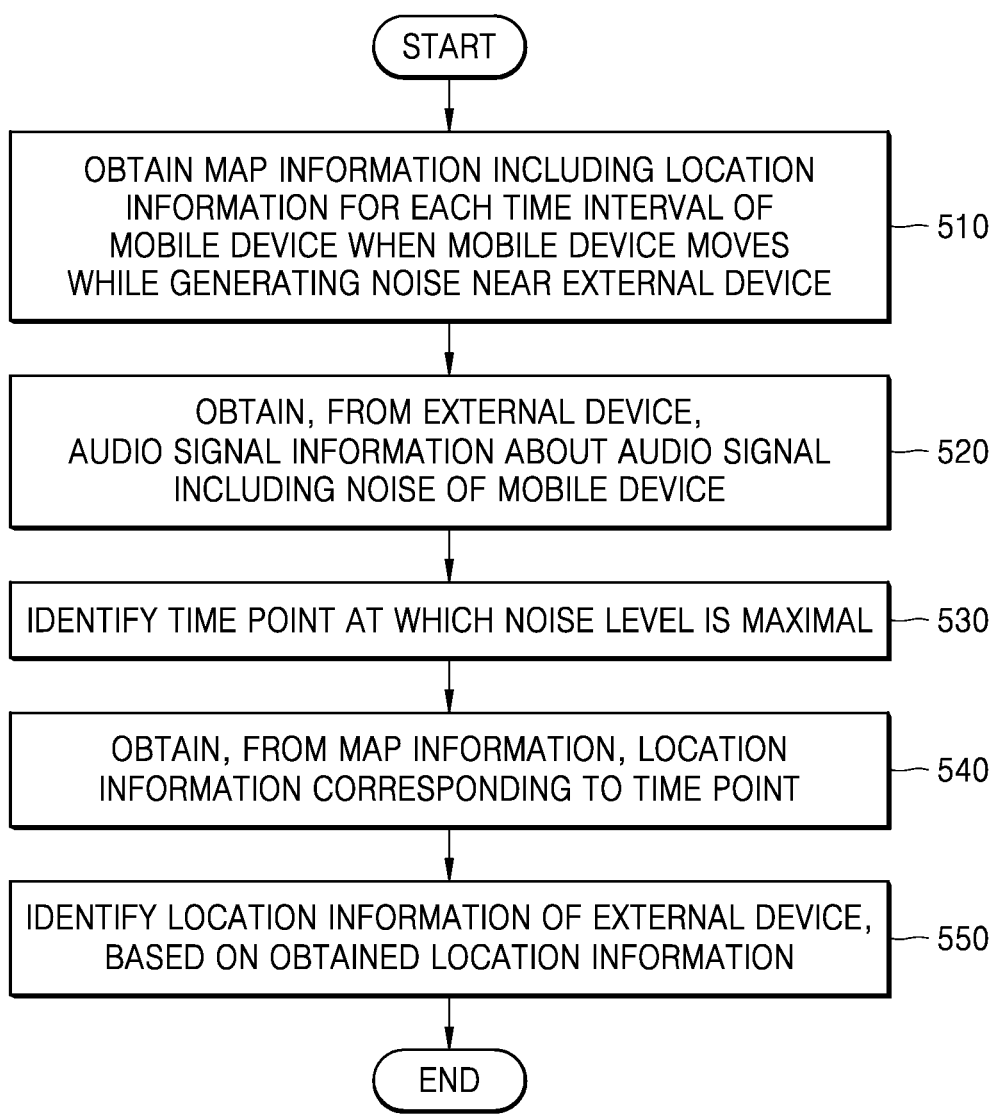
FIG. 5 is a flowchart illustrating an example method of identifying location information of an external device, according to an embodiment of the disclosure.

FIG. 5 is a flowchart illustrating an example method of identifying location information of the external device 2000, according to an embodiment of the disclosure.

Referring to FIG. 5, in operation 510, the electronic device 3000 may obtain map information including location information for each time interval of the mobile device 1000. The map information according to an embodiment of the disclosure may be obtained by the electronic device 3000 when the mobile device 1000 moves while generating noise near the external device 2000.

The noise of the mobile device 1000 according to an embodiment of the disclosure may be continuously generated in a constant level. For example, when the mobile device 1000 cleans the floor while moving, a certain level of noise may be continuously generated. Thus, according to an embodiment of the disclosure, without the need for a separate sound for identifying the location information of the external device 2000 to be output from the mobile device 1000 or the external device 2000, the location information of the external device 2000 may be identified based on the noise generated while the mobile device 1000 moves.

In operation 520, the electronic device 3000 may obtain, from the external device 2000, audio signal information about an audio signal including the noise of the mobile device 1000.

The information about an audio signal including the noise of the mobile device 1000 according to an embodiment of the disclosure may include, for example, data indicating an audio signal of a time domain, the audio signal of a time domain being detected by a microphone of the external device 2000.

In addition, the audio signal information may be information about the audio signal collected by the microphone of the external device 2000.

The external device 2000 according to an embodiment of the disclosure may convert the audio signal of a time domain into an audio signal of a frequency domain, the audio signal of a time domain including the noise of the mobile device 1000, the noise being collected by the external device 2000. The external device 2000 may transmit, to the electronic device 3000, the audio signal of a frequency domain as the audio signal information about the audio signal including the noise of the mobile device 1000. The electronic device 3000 according to an embodiment of the disclosure may extract information about the noise of the mobile device 1000, based on the audio signal of a frequency domain, and may identify the location information of the external device 2000. The extracted information about the noise may include information about noise levels for each time interval of the mobile device 1000, the noise levels being collected by the external device 2000. However, an embodiment of the disclosure is not limited thereto, and the external device 2000 may intactly transmit the audio signal collected by the microphone, as the audio signal information, to the electronic device 3000 without performing frequency modulation thereon.

In addition, the external device 2000 according to an embodiment of the disclosure may extract information about the noise of the mobile device 1000 from the audio signal, based on information about noise characteristics of the mobile device 1000, and may transmit the extracted information as the audio signal information to the electronic device 3000. The extracted information about the noise may include information about noise levels for each time interval of the mobile device 1000, the noise levels being collected by the external device 2000.

The information about noise characteristics of the mobile device 1000 may include information about noise characteristics according to an operation mode when the mobile device 1000 moves. For example, the information about noise characteristics may include noise characteristics of noise that may be generated by the mobile device 1000 according to an operation mode of the mobile device 1000, for example, information about frequency characteristics of the noise.

For example, when the mobile device 1000 moves while cleaning a floor in a power mode, information about noise of the mobile device 1000 may be extracted from an audio signal, based on information about noise characteristics (e.g., frequency characteristics) of the noise generated by the mobile device 1000.

However, an embodiment of the disclosure is not limited thereto, and the external device 2000 according to an embodiment of the disclosure may transmit, to the electronic device 3000, various types of information about the audio signal collected by the external device 2000. The electronic device 3000 according to an embodiment of the disclosure may identify a location of the external device 2000, based on the audio signal information received from the external device 2000.

In operation 530, the electronic device 3000 may identify a time point at which a noise level of the mobile device 1000 is maximal (e.g., highest), based on the audio signal information that is about the audio signal including the noise of the mobile device 1000 and is received from the external device 2000.

The electronic device 3000 according to an embodiment of the disclosure may obtain the information about noise levels for each time interval of the mobile device 1000, which are detected by the external device 2000, based on the information received from the external device 2000. For example, the electronic device 3000 may obtain the information about noise levels for each time interval of the mobile device 1000 from the audio signal information received from the external device 2000, based on the information about noise characteristics (e.g. frequency characteristics) of the mobile device 1000.

The noise of the mobile device 1000 according to an embodiment of the disclosure may not only include the noise generated when the mobile device 1000 moves, but also include a sound output from a speaker of the mobile device 1000 to identify the location information of the external device 2000 according to an embodiment of the disclosure.

To identify the location information of the external device 2000 according to an embodiment of the disclosure, the sound output from the speaker of the mobile device 1000 may include, for example, various types of sounds such as songs and alarms.

According to an embodiment of the disclosure, information about a sound level of the sound may be extracted from the audio signal including the sound, based on information about sound characteristics (e.g., frequency characteristics or level characteristics), which corresponds to the information about noise characteristics. In addition, the information about sound characteristics may be changed when the sound output from the mobile device 1000 changes, and the information about a sound level may be extracted from the audio signal including the changed sound, based on information about changed-sound characteristics.

According to an embodiment of the disclosure, a noise level of the mobile device 1000 may be corrected based on information about the noise level among the information about noise characteristics of the noise generated by the mobile device 1000. For example, the electronic device 3000 may obtain information about noise characteristics that may be changed according to an operation mode (e.g., power mode, normal mode, or low-sound mode) of the mobile device 1000. The information about noise characteristics may include information indicating the noise characteristics of the mobile device 1000 according to a time interval. The electronic device 3000 according to an embodiment of the disclosure may correct the noise levels for each time interval of the mobile device 1000, based on the obtained information about noise characteristics of the mobile device 1000, the noise being extracted from the audio signal information. In addition, the electronic device 3000 may identify a location of the external device 2000 by identifying a time point at which a noise level of the noise generated by the mobile device 1000 is maximal, based on the corrected noise levels.

For example, while approaching and moving to the external device 2000, the mobile device 1000 may operate in a power mode and then switch to and operate in a low-sound mode. Although the mobile device 1000 approaches the external device 2000, a noise level of the mobile device 1000, which is detectable by the external device 2000, may not increase as much as the mobile device 1000 approaches the external device 2000. Thus, when noise characteristics of the mobile device 1000 are changed while the mobile device 1000 moves, the noise level of the mobile device 1000 may be corrected according to the changed noise characteristics.

For example, considering that a louder noise is obtained in a section where an operation mode of the mobile device 1000 is a power mode rather than a normal mode, a noise level of the mobile device 1000, which is obtained in the section where the mobile device 1000 operates in the power mode according to an embodiment of the disclosure, may be corrected to a value obtained by subtracting 10 dB from the noise level. In contrast, considering that a lower noise is obtained in a section where the operation mode of the mobile device 1000 is a low-sound mode rather than a normal mode, a noise level of the mobile device 1000, which is obtained in the section where the mobile device 1000 operates in the low-sound mode according to an embodiment of the disclosure, may be corrected to a value obtained by adding 10 dB to the noise level. However, an embodiment of the disclosure is not limited thereto, and the noise level of the mobile device 1000 may be corrected based on the noise characteristics of the mobile device 1000 via various methods such that the noise level of the mobile device 1000 may be obtained in inverse proportion to a distance between the mobile device 1000 and the external device 2000.

According to an embodiment of the disclosure, the electronic device 3000 may obtain the information about noise levels for each time interval of the external device 2000 using various methods, and may identify, from the information, a location at which the noise level of the mobile device 1000 is maximal, the noise being detected by the external device 2000.

In operation 540, the electronic device 3000 may obtain location information of the mobile device 1000 from the map information of the mobile device 1000, the location information corresponding to the time point identified in operation 530. The map information of the mobile device 1000 according to an embodiment of the disclosure may include the location information for each time interval of the mobile device 1000, which is obtainable when the mobile device 1000 moves near the external device 2000. The electronic device 3000 according to an embodiment of the disclosure may obtain, from the map information, the location information of the mobile device 1000, which corresponds to the time point identified in operation 530.

In operation 550, the electronic device 3000 may identify the location information of the external device 2000, based on the location information of the mobile device 1000, which is obtained in operation 540. According to an embodiment of the disclosure, the electronic device 3000 may determine, as a location of the external device 2000, the location of the mobile device 1000, which corresponds the time point at which the noise level of the mobile device 1000, which is detected by the external device 2000, is maximal when the mobile device 1000 moves closer to the external device 2000. Thus, the electronic device 3000 may determine the location information of the mobile device 1000, which is obtained in operation 540, as the location information of the external device 2000.

The location information of the external device 2000, which is identified according to an embodiment of the disclosure, may be corrected based on a difference between direction information of the mobile device 1000 at at least two time points, the direction information being obtained by the external device 2000. Thus, the external device 2000 according to an embodiment of the disclosure may obtain direction information of the mobile device 1000 at a plurality of time points using a plurality of microphones and transmit the obtained direction information to the electronic device 3000 such that the location information of the external device 2000 may be corrected.

Figure 6:
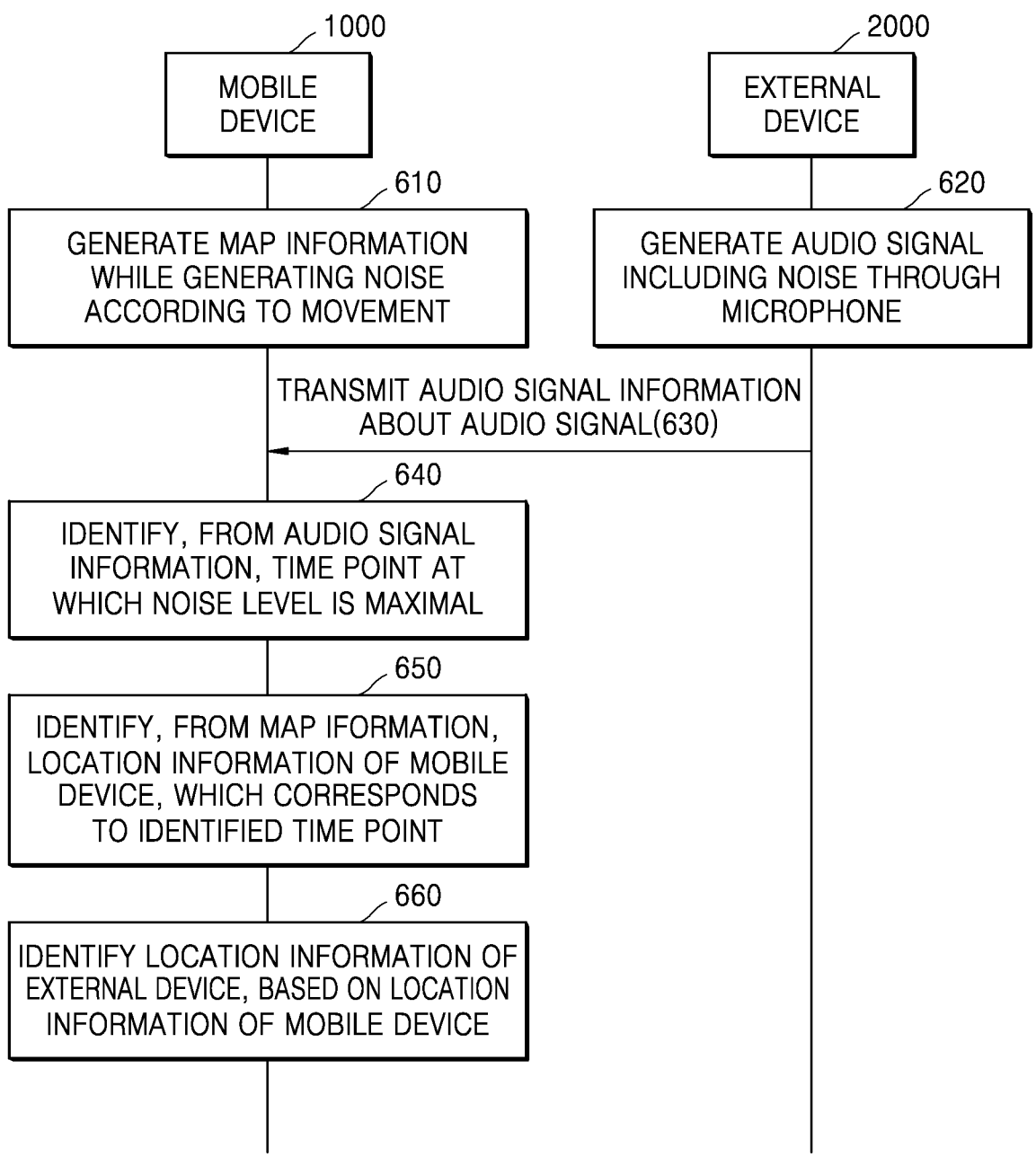
FIG. 6 is a signal flow diagram illustrating an example method of identifying location information of an external device, according to an embodiment of the disclosure.

FIG. 6 is a signal flow diagram illustrating an example method of identifying location information of the external device 2000, according to an embodiment of the disclosure.

Referring to FIG. 6, location information of the external device 2000 may be identified by the mobile device 1000 instead of the electronic device 3000. However, an embodiment of the disclosure is not limited thereto, and the location information of the external device 2000 may be identified by the external device 2000 as well as the mobile device 1000.

In operation 610, the mobile device 1000 may generate map information including location information for each time interval of the mobile device 1000 when moving while generating noise. According to an embodiment of the disclosure, in response to an input of a user, the mobile device 1000 may start moving while generating the noise, and when starting moving, the mobile device 1000 may generate map information.

In operation 620, the external device 2000 may generate an audio signal including the noise generated by the mobile device, the audio signal being detected by a microphone of the external device 2000. The external device 2000 according to an embodiment of the disclosure may generate the audio signal including the noise generated by the mobile device 1000 in operation 620 when the mobile device 1000 starts moving while generating the noise. For example, upon obtaining, from another external device, information notifying that the mobile device 1000 starts moving, the external device 2000 may generate the audio signal including the noise generated by the mobile device 1000 in operation 620.

In operation 630, the external device 2000 may transmit, to the mobile device 1000, audio signal information about the audio signal including the noise generated by the mobile device 1000, the audio signal being collected through the microphone in operation 620. According to an embodiment of the disclosure, the external device 2000 may transmit, to the mobile device 1000, as the audio signal information, information about the noise of the mobile device 1000, which is extracted from the audio signal, based on information about noise characteristics of the mobile device 1000.

The information about the noise of the mobile device 1000 according to an embodiment of the disclosure may include, for example, information about noise levels for each time interval of the mobile device 1000, the noise being collected by the external device 2000.

In operation 640, the mobile device 1000 may identify a time point, at which a noise level of the mobile device 1000 is maximal, from the audio signal information about the audio signal including the noise for each time interval of the mobile device 1000, the information being received from the external device 2000, and the noise being collected by the external device 2000.

In operation 650, the mobile device 1000 may identify location information of the mobile device 1000, which corresponds to the time point identified in operation 640, from the map information generated in operation 610. In addition, in operation 660, the mobile device 1000 may identify the location information of the external device 2000, based on the location information of the mobile device 1000, which is identified in operation 650.

According to an embodiment of the disclosure, the mobile device 1000 may determine, as the location information of the external device 2000, the location information of the mobile device 1000, which is identified in operation 650. According to an embodiment of the disclosure, when the noise level of the mobile device 1000, which is collected by the external device 2000, is maximal, it may be determined that the mobile device 1000 is in a location closest to the external device 2000.

However, an embodiment of the disclosure is not limited thereto, and the mobile device 1000 may correct the location information of the mobile device 1000, which is identified in operation 650, based on various information related to the location information of the external device 2000.

The location information of the external device 2000, which is identified in operation 660 according to an embodiment of the disclosure, may be transmitted to the external device 2000 or other devices. For example, the location information of the external device 2000, which is identified in operation 660 according to an embodiment of the disclosure, may be transmitted to the external device 2000 or other devices such that various operations (e.g., providing a user with location information of an external device) utilizing the location information of the external device 2000 may be performed.

According to an embodiment of the disclosure, an embodiment of the disclosure is not limited to a case in which the location information of the external device 2000 is identified by the mobile device 1000 when operations 640 to 660 are performed by the mobile device 1000, and operations 640 to 660 may also be performed by the external device 2000.

For example, the external device 2000 may identify the location information of the external device 2000 by receiving the map information generated in operation 610 from the mobile device 1000, instead of transmitting the audio signal information about the audio signal generated in operation 620 to the mobile device 1000 in operation 630. In addition, the external device 2000 may identify the location information of the external device 2000 by performing operations 640 to 660, based on the map information received from the mobile device 1000 and the audio signal information.

According to an embodiment of the disclosure, operations 630 to 660 may be performed after the movement of the mobile device 1000 is terminated. For example, when the movement of the mobile device 1000 is terminated, in response to a request of the mobile device 1000, the audio signal information may be transmitted from the external device 2000 in operation 630, and thus operations 640 to 660 may be performed by the mobile device 1000. For example, the audio signal information transmitted in operation 630 may be the audio signal information about the audio signal including the noise collected according to a time interval by the external device 2000 until the request of the mobile device 1000 is received.

However, an embodiment of the disclosure is not limited thereto, and in a case where the location information of the external device 2000 is identified by the external device 2000, when the movement of the mobile device 1000 is terminated, the map information generated by the mobile device 1000 is transmitted to the external device 2000, and thus operations 640 to 660 may be performed by the external device 2000.

In addition, operations 630 to 660 according to an embodiment of the disclosure may also be periodically performed. For example, the external device 2000 may periodically transmit the audio signal information about the audio signal generated in operation 620 to the mobile device 1000, in operation 630. The mobile device 1000 according to an embodiment of the disclosure may perform operations 640 to 660 whenever receiving the audio signal information from the external device 2000.

However, an embodiment of the disclosure is not limited thereto, and when the location information of the external device 2000 is identified by the external device 2000, the map information generated by the mobile device 1000 may be periodically transmitted to the external device 2000. The external device 2000 according to an embodiment of the disclosure may perform operations 640 to 660 whenever receiving the map information from the mobile device 1000.

Figure 7:
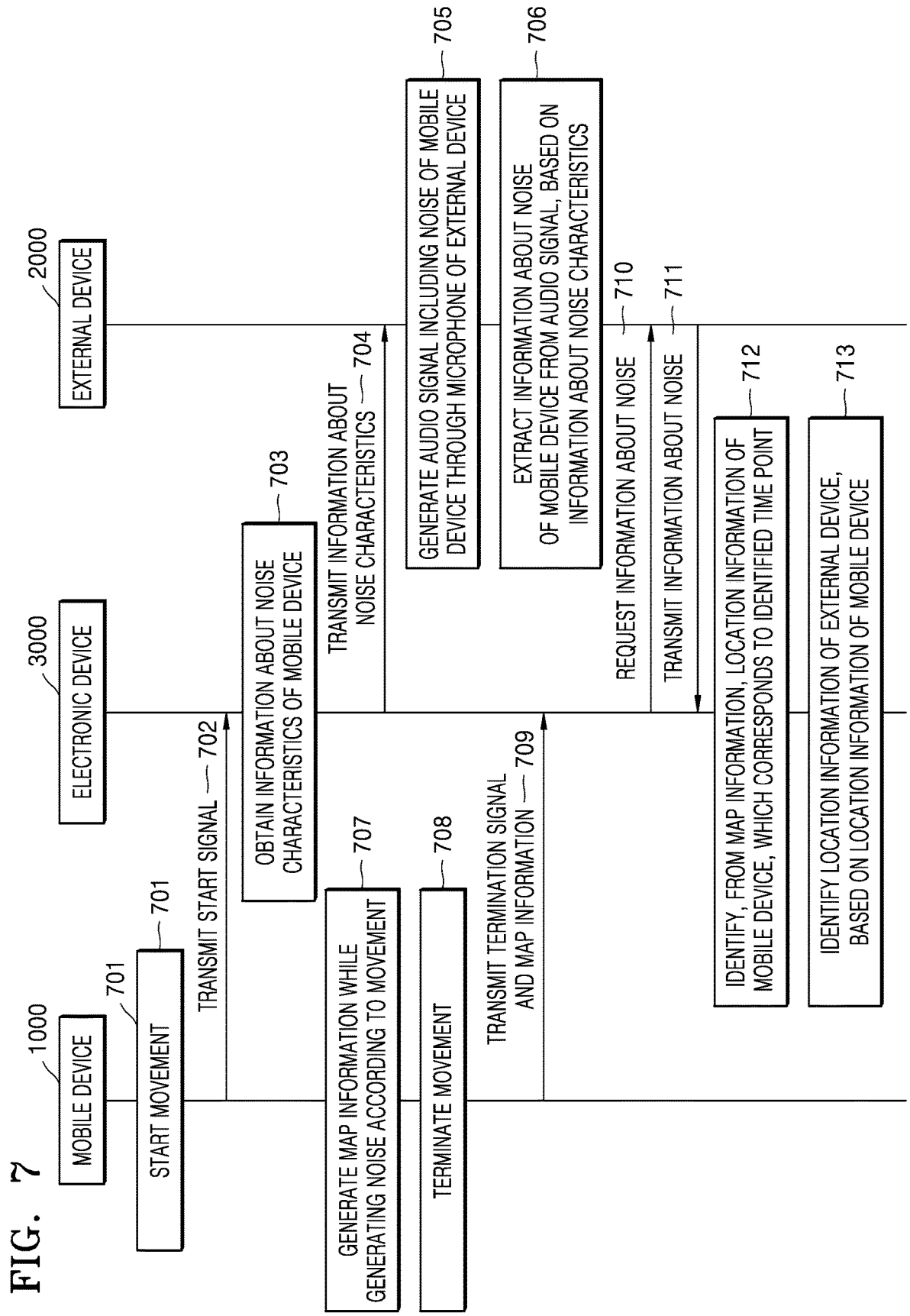
FIG. 7 is a signal flow diagram illustrating an example method of identifying location information of an external device, according to an embodiment of the disclosure.

FIG. 7 is a signal flow diagram illustrating an example method of identifying location information of the external device 2000, according to an embodiment of the disclosure.

Referring to FIG. 7, in operation 701, the mobile device 1000 may start moving. For example, the mobile device 1000 may start moving in the home to clean the floor according to a user input signal.

In operation 702, the mobile device 1000 may transmit, to the electronic device 3000, a start signal indicating that the mobile device 1000 starts moving. The electronic device 3000 according to an embodiment of the disclosure may start an operation for identifying the location information of the external device 2000 upon receiving the start signal from the mobile device 1000.

In operation 703, the electronic device 3000 may obtain information about noise characteristics of the mobile device 1000. According to an embodiment of the disclosure, the electronic device 3000 may obtain, from the mobile device 1000, the information about noise characteristics of noise generated when the mobile device 1000 moves.

The mobile device 1000 according to an embodiment of the disclosure may move while generating noise having different characteristics according to an operation state. For example, when the mobile device 1000 starts moving while cleaning the floor in a power mode in operation 701, the mobile device 1000 may transmit, to the electronic device 3000, information about noise characteristics (e.g., frequency characteristics or level characteristics) of noise generated when the mobile device 1000 cleans the floor in the power mode.

However, an embodiment of the disclosure is not limited thereto, and instead of receiving the information about noise characteristics from the mobile device 1000, the electronic device 3000 may receive information for obtaining the noise characteristics from the mobile device 1000 to obtain, based on the received information, information about the noise characteristics.

For example, the electronic device 3000 may receive, from the mobile device 1000, information about a current operation state of the mobile device 1000 to obtain information about noise characteristics, which corresponds to the current operation state. The electronic device 3000 according to an embodiment of the disclosure may pre-obtain, from the mobile device 1000 or an outer source, operation states that may be performed on the mobile device 1000 and information (e.g., information about detailed specifications related to an operation of the mobile device 1000) about noise characteristics corresponding to each of the operation states, and then obtain information about noise characteristics corresponding to a current operation state of the mobile device 1000, based on the pre-obtained information.

In operation 704, the electronic device 3000 may transmit, to the external device 2000, the information about noise characteristics of the mobile device 1000, which is received from the mobile device 1000 in operation 703. According to an embodiment of the disclosure, the information about noise characteristics may be used to extract information about the noise of the mobile device 1000 from an audio signal detected by a microphone of the external device 2000.

In addition, the information about noise characteristics according to an embodiment of the disclosure may be used to correct a noise level of the mobile device 1000.

In operation 705, the external device 2000 may generate the audio signal including the noise of the mobile device 1000, which is detected by the microphone of the external device 2000. According to an embodiment of the disclosure, the external device 2000 may obtain the audio signal in operation 705 upon receiving the information about noise characteristics of the mobile device 1000 from the electronic device 3000.

In operation 706, the external device 2000 may extract information about the noise the mobile device 1000 from the audio signal collected by the microphone, based on the information about noise characteristics. However, an embodiment of the disclosure is not limited thereto, and the external device 2000 may obtain the information about the noise from an outer source when the information about the noise is extracted from another external device. The information about the noise of the mobile device 1000 according to an embodiment of the disclosure may include information about noise levels for each time interval of the mobile device 1000, which are collected by the external device 2000.

According to an embodiment of the disclosure, the external device 1000 is not limited to the only one that extracts the information about the noise of the mobile device 1000 from the audio signal, and the electronic device 3000 may also extract the information about the noise of the mobile device 1000 by receiving the audio signal from the external device 2000. The electronic device 3000 according to an embodiment of the disclosure may receive the audio signal including the noise of the mobile device 1000 from the external device 2000, without needing to transmit the information about noise characteristics of the mobile device 1000 to the external device 2000. For example, the electronic device 3000 may transmit, to the external device 2000, a signal for requesting the external device 2000 to obtain the audio signal including the noise of the mobile device 1000 and transmit the audio signal to the electronic device 3000, instead of the information about noise characteristics of operation 704. The electronic device 3000 according to an embodiment of the disclosure may extract the information about the noise of the mobile device 1000 from the audio signal received from the external device 2000 upon transmitting the request signal to the external device 2000, based on the information about noise characteristics of the mobile device 1000.

In operation 707, the mobile device 1000 may generate map information including location information for each time interval of the mobile device 1000 while generating the noise near the external device 2000 according to the movement of the mobile device 1000. However, an embodiment of the disclosure is not limited thereto, and the mobile device 1000 may obtain the map information from an outer source when the map information is generated by another external device. According to an embodiment of the disclosure, the location information of the external device 2000 may be identified based on the location information of the mobile device 1000 included in the map information.

In operation 708, the mobile device 1000 may terminate the movement. For example, when the mobile device 1000 completes floor cleaning and returns to a charging dock, the mobile device 1000 may terminate the movement.

In operation 709, the mobile device 1000 may transmit a termination signal notifying termination of the movement and the map information generated in operation 707 according to the movement of the mobile device 1000, upon the terminating of the movement of the mobile device 1000 in operation 708.

The electronic device 3000 according to an embodiment of the disclosure may transmit a request for the information about the noise of the mobile device 1000 to the external device 2000 in operation 710 to identify the location information of the external device 2000. In addition, in operation 711, the external device 2000 may transmit the information about the noise of the mobile device 1000, which is extracted in operation 706, to the electronic device 3000 upon receiving the request of the electronic device 3000.

The external device 2000 according to an embodiment of the disclosure may continuously generate an audio signal in operation 705, between operation 703 of obtaining the information about noise characteristics from the electronic device 3000 and operation 710 of receiving the request for the information about the noise from the electronic device.

In addition, the external device 2000 may continuously extract information about the noise of the mobile device 1000 in operation 706 when the audio signal is continuously generated. Upon receiving the request for the information about the noise from the electronic device 3000 in operation 710, the external device 2000 may stop operations of the generating of the audio signal and extracting of the information about the noise of operations 705 and 706, and may transmit the information about the noise of the mobile device 1000 in operation 711.

In operations 712 and 713, the electronic device 3000 may identify the location information of the external device 2000, based on the map information received from the mobile device 1000 and the information about the noise of the mobile device 1000, which is received from the external device 2000.

According to an embodiment of the disclosure, in operation 712, the electronic device 3000 may identify a time point at which a noise level is maximal, based on the information about the noise of the mobile device 1000, and may identify location information of the mobile device 1000, which corresponds to the identified time point, from the map information. In addition, in operation 713, the electronic device 3000 may identify the location information of the external device 2000, based on the location information of the mobile device 1000, which is identified in operation 712.

The location information of the external device 2000, which is identified by the electronic device 3000 in operation 713 according to an embodiment of the disclosure, may also be transmitted to various apparatuses (e.g., the mobile device 1000, the external device 2000, or other user devices). For example, the location information of the external device 2000, which is identified in operation 713 according to an embodiment of the disclosure, may be transmitted to other devices such that various operations (e.g., providing a user with location information of an external device) utilizing the location information of the external device 2000 may be performed.

FIG. 8 is a diagram illustrating an example of extracting information about noise of the mobile device 1000, according to an embodiment of the disclosure.

Referring to FIG. 8, while the mobile device 1000 moves from a position 801 to a position 802, the external device 2000 may collect an audio signal including noise of the mobile device 1000 through a microphone at a position 803. According to an embodiment of the disclosure, information about noise levels for each time interval of the mobile device 1000 may be extracted from the audio signal, based on noise characteristics of the mobile device 1000.

The information about noise levels of the mobile device 1000 according to an embodiment of the disclosure may be extracted from audio signal information about the audio signal, based on at least one of an artificial neural network or HPSS. However, an embodiment of the disclosure is not limited thereto, and the information about noise levels of the mobile device 1000 may be extracted from the audio signal information about the audio signal collected by the external device 2000, based on various methods of identifying the noise levels of the mobile device 1000 from the audio signal.

For example, any one of the noise levels obtained through various methods of obtaining noise levels of the artificial neural network and the HPSS may be obtained as a noise level of the mobile device 1000. A representative value (e.g., an average value or a median value) of a plurality of noise levels of the mobile device 1000, which are obtained through various methods of obtaining noise levels of the artificial neural network and the HPSS, may be obtained as the noise level of the mobile device 1000. However, an embodiment of the disclosure is not limited thereto, and the noise level of the mobile device 1000 may be obtained from the audio signal, according to various methods.

According to an embodiment of the disclosure, the neural artificial neural network that may be used to extract the information about noise levels of the mobile device 1000 may be various types of data recognition models based on a neural network such as a DNN, an RNN, or a CNN. According to an embodiment of the disclosure, probability information indicating a specific gravity of the noise level of the mobile device 1000 in the audio signal may be obtained through the artificial neural network, based on the audio signal collected by the external device 2000 and information about the noise characteristics of the mobile device 1000.

For example, P(robot) of FIG. 8 may indicate a specific gravity of the noise level of the mobile device 1000 in the audio signal collected by the external device 2000 when the mobile device 1000 is in the position 801 or 802. In addition, P(else) may indicate a specific gravity of other sounds excluding the noise generated by the mobile device 1000 in the audio signal. Thus, according to an embodiment of the disclosure, without needing to separate a noise component from the audio signal, the noise level of the mobile device 1000 may be obtained based on the probability information obtained through the artificial neural network.

For example, when the mobile device 1000 is at the position 801, a sound pressure level (SPL) value indicating the noise level of the mobile device 1000 may be determined to be 52 dB that is a value to which P(robot)=0.8, that is, a probability value with respect to an overall sound level of the audio signal, is applied. In addition, when the mobile device 1000 is at the position 802, the SPL value that is the noise level of the mobile device 1000 may be determined to be 64 dB that is a value to which P(robot)=0.94, that is, a probability value with respect to the overall sound level of the audio signal, is applied.

According to an embodiment of the disclosure, the noise level of the mobile device 1000 may be obtained based on artificial neural networks that are different from each other, according to the noise characteristics of the noise generated by the mobile device 1000. For example, the mobile device 1000 may perform a cleaning operation that generates different noise levels according to a power mode, a normal mode, and a low-sound mode. Thus, the noise level of the mobile device 1000 may be obtained based on the artificial neural networks that are different from each other according to an operation mode (e.g., the power mode, the normal mode, or the low-sound mode) of the mobile device 1000.

In addition, the information about noise levels of the mobile device 1000 according to an embodiment of the disclosure may be obtained according to the HPSS. According to an embodiment of the disclosure, the noise component of the mobile device 1000 may be extracted from the audio signal through the HPSS.

The HPSS relates to a method of separating a harmonic component and a percussive component in an audio signal. According to an embodiment of the disclosure, the noise component of the mobile device 1000 may be separated, from the audio signal, as the harmonic component through the HPSS. For example, when the noise of the mobile device 1000 is generated by a motor operating at a rotational speed of 18,000 RPM, the noise of a frequency of 18,000/60=300 Hz, which is a value in which 18,000 RPM is converted into Hz, may be generated by the motor of the mobile device 1000. Thus, the noise component of the mobile device 1000 in a frequency band of 300 Hz may be extracted from the audio signal through the HPSS. According to an embodiment of the disclosure, the noise level of the mobile device 1000 may be obtained from the noise component of the mobile device 1000, the noise component being extracted through the HPSS.

FIG. 9 is a diagram illustrating an example of a noise level of the mobile device 1000, according to an embodiment of the disclosure.

Referring to 910 of FIG. 9, a noise level 911 of the mobile device 1000 may vary according to a time interval when the mobile device 1000 moves. The noise level 911 of the mobile device 1000 according to an embodiment of the disclosure may be obtained as described in Table 1, according to various methods of identifying a noise level of the mobile device 1000 from an audio signal, such as the artificial neural network and the HPSS.

TABLE 1

|  |  | Time | | |
| --- | --- | --- | --- | --- |
|  |  | 12:20 PM | 12:25 PM | 12:35 PM |
| Noise of mobile device | Probability (%) | 50 | 70 | 90 |
|  | SPL (dB) | 40 | 47 | 59 |
| Other noises (e.g. background noise) | Probability (%) | 50 | 30 | 10 |
|  | SPL (dB) | 40 | 40 | 40 |

Other noises 912 than the noise level 911 of the mobile device 1000 in the audio signal collected by the external device 2000 may remain at the same level without varying over time. Although the noise level 911 of the mobile device 1000 may continuously vary according to the movement of the mobile device 1000, the other noises 912 may be observed to remain at the same level.

The electronic device 3000 according to an embodiment of the disclosure may identify a time point at which the noise level of the mobile device 1000 is a maximum value. In 910, the noise level may be a maximum value at 913, and a time point at this time may be identified as 12:35 PM. The electronic device 3000 according to an embodiment of the disclosure may identify location information of the external device 2000, based on location information of the mobile device 1000 at 12:35 PM that is the time point at which the noise level is the maximum value.

Referring to FIG. 9, 920 illustrates an example of map information of the mobile device 1000 and information about noise characteristics of the mobile device 1000, and location information of the mobile device 1000 displayed in 920 and the information about noise characteristics of the mobile device 1000 may be represented as shown in Table 2.

TABLE 2

|  |  | Time | | |
| --- | --- | --- | --- | --- |
|  |  | 12:20 PM | 12:25 PM | 12:35 PM |
| Location | X | 0 | 20 | 10 |
|  | Y | −20 | 0 | 40 |
| Cleaning mode | Mode | Power | Power | Power |

According to an embodiment of the disclosure, the mobile device 1000 may sequentially pass positions 921, 922, and 923, which are illustrated in 920, at 12:20 PM, 12:25 PM, and 12:35 PM, respectively. The electronic device 3000 according to an embodiment of the disclosure may identify, as a location of the external device 2000, the position 923, which is a location of the mobile device 1000 at 12:35 PM that is the time point at which the noise level is the maximum value.

Figure 10:
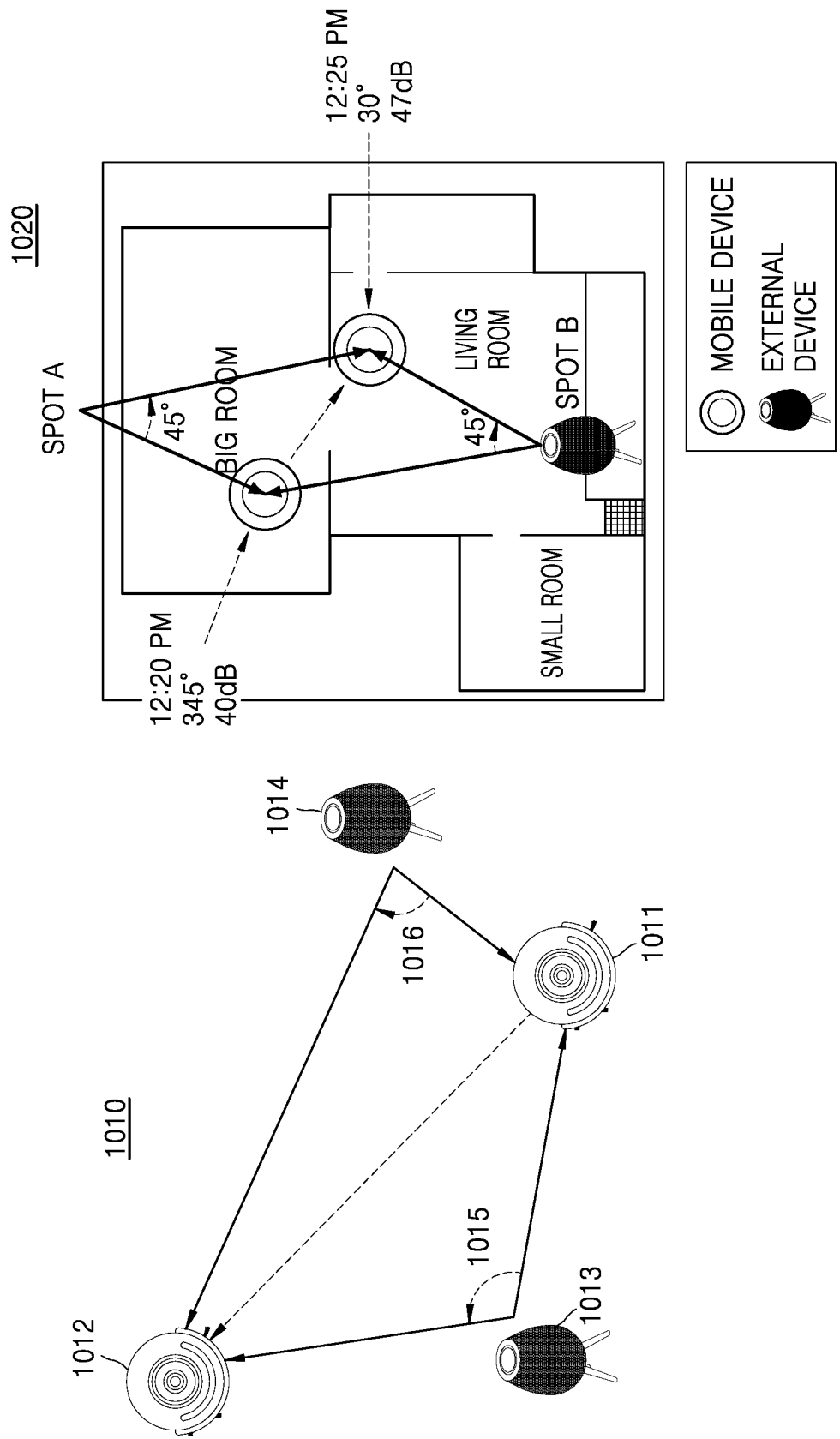
FIG. 10 is a diagram illustrating an example of identifying location information of an external device, according to an embodiment of the disclosure.

FIG. 10 is a diagram illustrating an example of identifying location information of the external device 2000, according to an embodiment of the disclosure.

Referring to FIG. 10, in 1010, while the mobile device 1000 moves from a position 1011 to a position 1012, external devices 1013 and 1014 may estimate directions of noise generated by the mobile device 1000 according to a time interval. The external devices 1013 and 1014 according to an embodiment of the disclosure may collect the noise of the mobile device 1000 using a plurality of microphones, such that a direction in which the mobile device 1000 is located may be estimated based on each of the external devices 1013 and 1014.

For example, the plurality of microphones may be located apart from each other by a predetermined distance in the external devices 1013 and 1014, and the direction of the mobile device 1000 may be estimated based on a phase difference between the noise of the mobile device 1000, which is collected by the plurality of microphones, and the distance between the plurality of microphones. However, an embodiment of the disclosure is not limited thereto, and the direction of the mobile device 1000 may be estimated based on various methods.

The electronic device 3000 according to an embodiment of the disclosure may identify at least one candidate location for the external devices 1013 and 1014, based on a difference between a plurality of pieces of direction information of the mobile device 1000, which are obtained by the external devices 1013 and 1014 at at least two time points. In addition, the electronic device 3000 may determine one location from among the at least one candidate location, based on noise levels of the mobile device 1000 at the at least two time points, the noise levels being collected by the plurality of microphones of the external devices 1013 and 1014. According to an embodiment of the disclosure, location information of the external devices 1013 and 1014 may be corrected based on the determined one location.

For example, the location information of the external devices 1013 and 1014 may be determined based on a difference between directions 1015 and 1016 of the mobile device 1000, which are measured at two time points. Locations of the external devices 1013 and 1014 that may obtain the difference between the directions 1015 and 1016 may be estimated based on the positions 1011 and 1012 of the mobile device 1000, such that the location information of the external devices 1013 and 1014 may be determined.

Referring to 1020, the mobile device 1000 may move from a bedroom to a living room between 12:20 PM to 12:25 PM according to a direction of an arrow, and a direction of the mobile device 1000, which may be obtained by the external device 2000 according to an embodiment of the disclosure, may be the same as shown in Table 3.

TABLE 3

|  | Time | | |
| --- | --- | --- | --- |
|  | 12:20 PM | 12:25 PM | 12:35 PM |
| Direction (angle) | 345 degrees | 30 degrees | 85 degrees |

The electronic device 3000 according to an embodiment of the disclosure may obtain, from the external device 2000, a difference between directions of the mobile device 1000, which are obtained at different time points. For example, a difference between directions of the mobile device 1000 at 12:20 PM and 12:25 PM may be determined to be 45 degrees. In 1020, a spot A and a spot B may be identified as candidate locations of the external device 2000, in which a difference between directions with respect to travel positions of the mobile device 1000 at 12:20 PM and 12:25 PM may be determined to be 45 degrees.

According to an embodiment of the disclosure, the electronic device 3000 may identify one of the spot A and the spot B as the location information of the external device 2000, based on at least one of map information or noise levels for each time interval of the mobile device 1000. The noise levels for each time interval of the mobile device 1000 may be obtained according to various methods of identifying a noise level of the mobile device 1000 from an audio signal, such as the artificial neural network or the HPSS.

For example, noise levels of the mobile device 1000, which are collected by the external device 2000 at 12:20 PM and 12:25 PM, are 40 dB and 47 dB, respectively, and because a noise level of the mobile device 1000 gradually increases, it is determined that the mobile device 1000 becomes closer to the external device 2000 in response to the mobile device 1000 moving at 12:20 PM and 12:25 PM. Thus, it may be determined that the location information of the external device 2000 is the spot B corresponding to a location where the mobile device 1000 becomes gradually closer to the external device 2000. In addition, according to the map information, a spot A is a location corresponding to the outside of the home, and thus, is determined to be a spot where the external device 2000 may not be located, and thus it is determined that the location information of the external device 2000 is a spot B.

The electronic device 3000 according to an embodiment of the disclosure may correct the location information of the external device 2000, which may be identified based on the noise level of the mobile device 1000, based on the direction information of the mobile device 1000. For example, the electronic device 3000 may periodically obtain the direction information of the mobile device 1000, and may correct the location information of the external device 2000, based on the obtained direction information.

According to an embodiment of the disclosure, when the mobile device 1000 may not move to a location adjacent to the external device 2000 due to an obstacle, the location information of the external device 2000, which may be identified based on the noise level of the mobile device 1000, may be substantially different from actual location information of the external device 2000. Accordingly, the electronic device 3000 according to an embodiment of the disclosure may correct the location information of the external device 2000 using the location information of the external device 2000, which is identified based on the direction information of the mobile device 1000.

For example, the electronic device 3000 may identify, as the location information of the external device 2000, an intermediate location between the location information of the external device 2000, which may be identified based on the noise level of the mobile device 1000, and the location information of the external device 2000, which may be identified based on the direction information of the mobile device 1000.

As another example, when the maximum value of the noise level of the mobile device 1000 obtained according to an embodiment is less than or equal to a reference value, the electronic device 3000 may determine that the mobile device 1000 is not able to move to a location adjacent to the external device 2000 due to an obstacle. Accordingly, the location information of the external device 2000, which is identified based on the noise level of the mobile device 1000, may be substantially different from an actual location.

When the maximum value of the noise level of the mobile device 1000 is less than or equal to a reference value, the electronic device 3000 according to an embodiment of the disclosure may correct the location information of the external device 2000, which is identified based on the noise level of the mobile device 1000, based on the location information of the external device 2000, which may be identified based on the direction information of the mobile device 1000. For example, the electronic device 3000 may determine, as the location information of the external device 2000, the location information of the external device 2000, which may be identified based on the direction information of the mobile device 1000. According to an embodiment of the disclosure, the maximum value of the noise level of the mobile device 1000 may be determined based on a corrected value, based on information about noise characteristics of the mobile device 1000.

However, an embodiment of the disclosure is not limited thereto, and the electronic device 3000 may identify the location information of the external device 2000 via various methods, based on the location information of the external device 2000, which may be identified based on the noise level of the mobile device 1000, and the location information of the external device 2000, which may be identified based on the direction information of the mobile device 1000.

Figure 11:
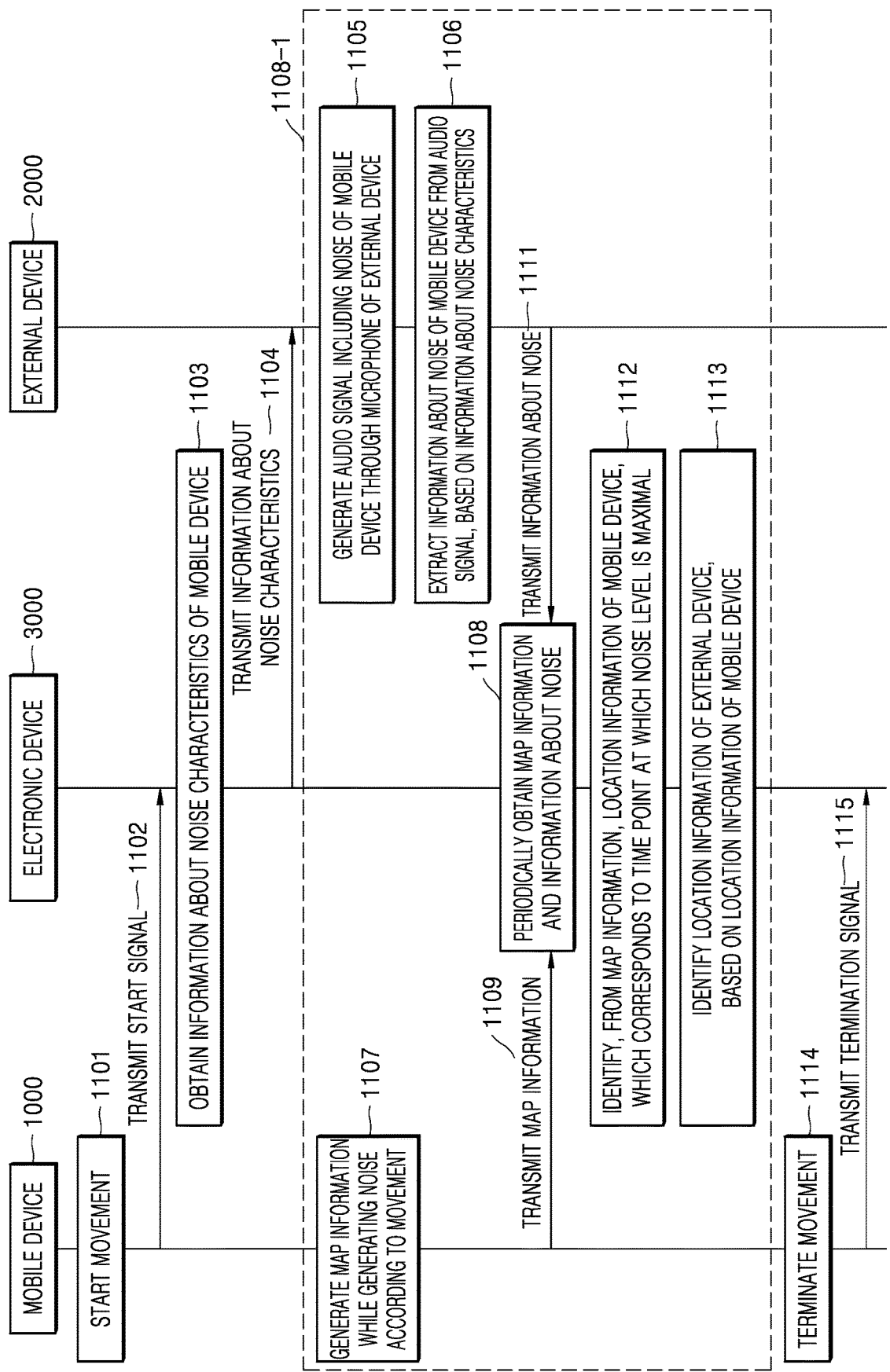
FIG. 11 is a signal flow diagram illustrating an example method of identifying location information of an external device, according to an embodiment of the disclosure.

FIG. 11 is a signal flow diagram illustrating an example method of identifying location information of the external device 2000, according to an embodiment of the disclosure.

Referring to FIG. 11, instead of obtaining map information and information about noise after movement of the mobile device 1000 is terminated, the electronic device 3000 according to an embodiment of the disclosure may periodically obtain the map information and the information about noise from the mobile device 1000 and the external device 2000. Accordingly, the electronic device 3000 may periodically identify the location information of the external device 2000, based on the map information and the information about noise. For example, the electronic device 3000 may identify the location information of the external device 2000 by obtaining the map information and the information about noise every second.

In operation 1101, the mobile device 1000 may start moving. For example, the mobile device 1000 may start moving in the home to clean the floor according to a user input signal.

In operation 1102, the mobile device 1000 may transmit, to the electronic device 3000, a start signal indicating that the mobile device 1000 starts moving. The electronic device 3000 according to an embodiment of the disclosure may start an operation for identifying location information of the external device 2000 upon receiving the start signal from the mobile device 1000.

In operation 1103, the electronic device 3000 may obtain information about noise characteristics of the mobile device 1000. According to an embodiment of the disclosure, the electronic device 3000 may obtain, from the mobile device 1000, the information about noise characteristics (e.g., frequency characteristics) of the noise generated when the mobile device 1000 moves.

In operation 1104, the electronic device 3000 may transmit, to the external device 2000, the information about noise characteristics of the mobile device 1000, the information being received from the mobile device 1000. According to an embodiment of the disclosure, the information about noise characteristics may be used to extract the information about the noise of the mobile device 1000 from an audio signal detected by a microphone of the external device 2000.

In operation 1105, the audio signal including the noise of the mobile device may be generated via the microphone of the external device 2000. According to an embodiment of the disclosure, the external device 2000 may generate the audio signal in operation 1105 upon receiving the information about noise characteristics of the mobile device 1000 from the electronic device 3000.

In operation 1106, the external device 2000 may extract the information about the noise of the mobile device 1000 from the audio signal collected by the microphone, based on the information about noise characteristics. The information about the noise of the mobile device 1000 according to an embodiment of the disclosure may include information about noise levels for each time interval of the mobile device 1000, which are collected by the external device 2000.

In operation 1107, the mobile device 1000 may generate map information including location information for each time interval of the mobile device 1000 while generating the noise near the external device 2000 according to the movement of the mobile device 1000. According to an embodiment of the disclosure, the location information of the external device 2000 may be identified based on the location information of the mobile device 1000 included in the map information.

When the mobile device 1000 and the external device 2000 periodically transmit the map information and the information about the noise to the electronic device 3000 in operations 1109 and 1111, the electronic device may periodically transmit the map information and the information about the noise in operation 1108.

The mobile device 1000 according to an embodiment of the disclosure may continuously generate map information according to the movement of the mobile device 1000, and may periodically transmit the generated map information to the electronic device 3000.

In addition, the external device 2000 according to an embodiment of the disclosure may generate an audio signal including noise of the mobile device 1000 through the microphone according to movement of the mobile device 1000, and may continuously extract information about the noise of the mobile device 1000 from the audio signal. In addition, the external device 2000 may periodically transmit the information about the noise of the mobile device 1000 to the electronic device 3000.

In operation 1112, the electronic device 3000 may identify the location information of the mobile device 1000 when the noise level of the mobile device 1000 is maximal, based on the map information received from the mobile device 1000 and the information about the noise of the mobile device, the information being received from the external device 2000. In addition, in operation 1113, the electronic device 3000 may identify the location information of the external device 2000, based on the location information of the mobile device 1000, which is identified in operation 1112.

The electronic device 3000 according to an embodiment of the disclosure may periodically update the identified location information of the external device 2000 upon periodically obtaining the map information and the information about the noise of the mobile device 1000. According to an embodiment of the disclosure, when operations in operations 1105 to 1113 included in 1108-1 are repeatedly performed until the movement of the mobile device 1000 is terminated, the location information of the external device 2000, which is identified by the electronic device, may be continuously updated.

Although the external device 2000 according to an embodiment of the disclosure continuously exists in a fixed location while the mobile device 1000 moves, the location information of the external device 2000 may be periodically changed based on the periodically obtained information about the noise of the mobile device 1000. For example, when the mobile device 1000 moves toward the external device 2000, a maximum value of the periodically obtained noise level of the mobile device 1000 is determined to be a larger value, and thus a location of the mobile device 1000 may be periodically changed even when the mobile device 1000 is in a fixed location.

Accordingly, unlike a case, such as the example illustrated in FIG. 7, where the location information of the external device 2000 is identified after the movement of the mobile device 1000 is terminated, there may be a difference between an actual location of the external device 2000 and a location of the external device 2000, which is periodically identified according to an embodiment of the disclosure.

However, although there is a significant difference between the location of the external device 2000, which is identified according to an embodiment of the disclosure, and the actual location of the external device 2000, the electronic device 3000 may perform various operations using the location of the external device 2000 as long as an approximate location of the external device 2000 is identified. For example, the electronic device 3000 may display, on a display, information about a room where the external device 2000 is located among a plurality of rooms (e.g., a living room, a hall, a room, or a utility room) in the home, based on the location information of the external device 2000, which is identified according to an embodiment of the disclosure. Although the identified location of the external device 2000 is not accurate, the location of the external device 2000 may be periodically identified, and thus the approximate location where the external device 2000 exists may be provided to a user before the mobile device 1000 terminates the movement.

In addition, when the location of the external device 2000 is identified after waiting for the mobile device 1000 to terminate the movement, the location information of the external device 2000 may be identified after waiting for an extremely long time until the mobile device 1000 terminates the movement. For example, when the mobile device 1000 cleans the floor while moving from place to place in the home, it may take a considerable amount of time until the movement is terminated, as it is necessary for the mobile device 1000 to pass all movement-possible locations in the home.

However, when the location information of the external device 2000 is periodically identified before the mobile device 1000 terminates the movement, the electronic device 3000 may first perform various operations using the location of the external device 2000 before the movement of the mobile device 1000 is terminated.

When the movement of the mobile device 1000 is terminated in operation 1114, the mobile device 1000 may transmit, to the electronic device 3000, a termination signal notifying that the movement is terminated in operation 1115.

According to an embodiment of the disclosure, when the movement of the mobile device 1000 is terminated, the electronic device 3000 may stop an operation of identifying the location information of the external device 2000. In addition, the electronic device 3000 may transmit, to the external device 2000, the termination signal notifying that the movement of the mobile device 1000 is terminated, to stop operations 1105, 1106, and 1111, which are repeatedly performed by the external device 2000.

Figure 12:
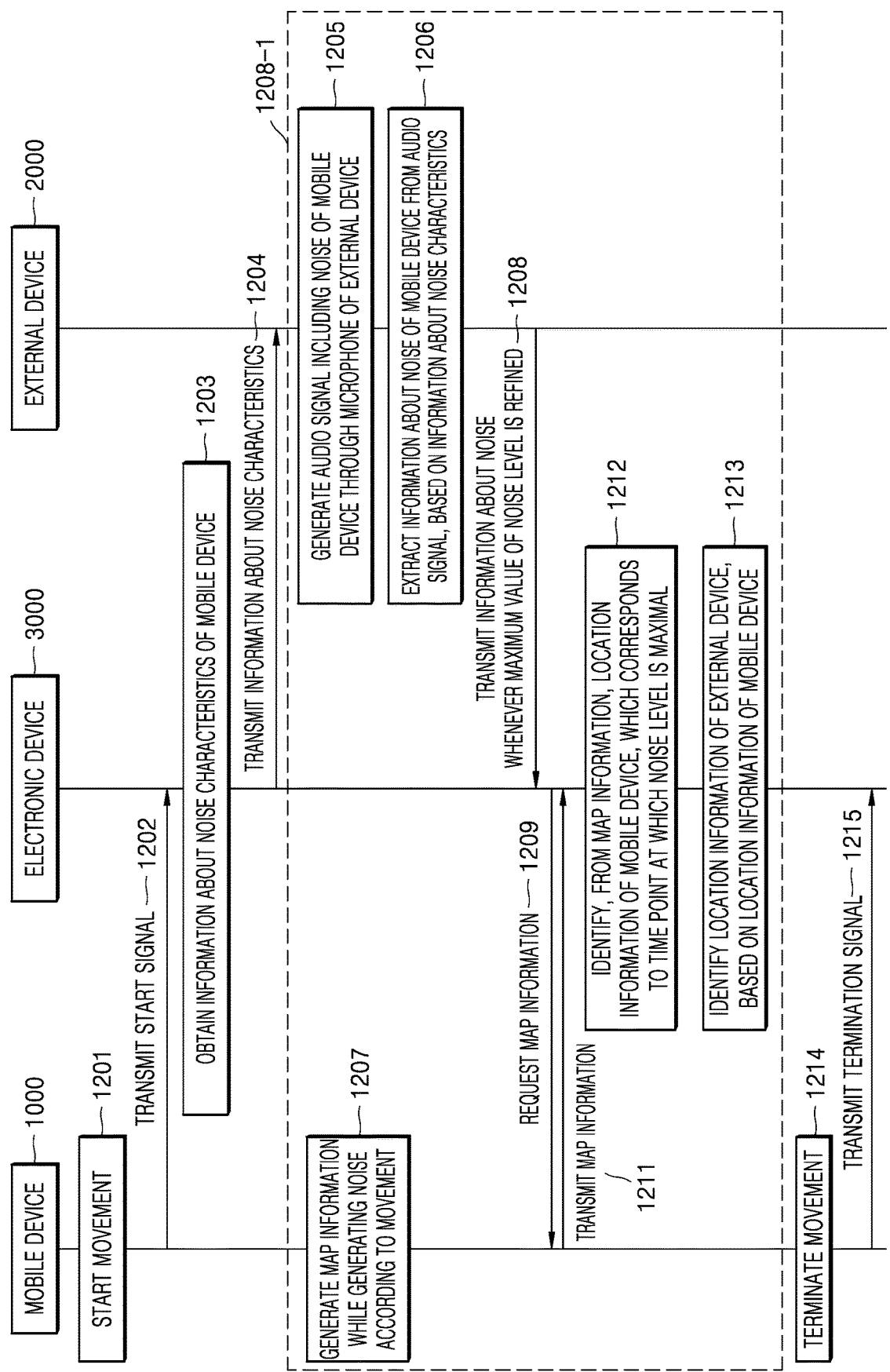
FIG. 12 is a signal flow diagram illustrating an example method of identifying location information of an external device, according to an embodiment of the disclosure.

FIG. 12 is a signal flow diagram illustrating an example method of identifying location information of the external device 2000, according to an embodiment of the disclosure.

Referring to FIG. 12, the electronic device 3000 according to an embodiment of the disclosure may obtain, from the mobile device 1000 and the external device 2000, map information and information about noise whenever a maximum value of a noise level of the mobile device 1000, which is extracted from the external device 2000, is refined, instead of obtaining the map information and the information about noise after movement of the mobile device 1000 is terminated or periodically obtaining the map information and the information about noise.

In operation 1201, the mobile device 1000 may start moving. For example, the mobile device 1000 may start moving in the home to clean the floor according to a user input signal.

In operation 1202, the mobile device 1000 may transmit, to the electronic device 3000, a start signal indicating that the mobile device 1000 starts moving. The electronic device 3000 according to an embodiment of the disclosure may start an operation for identifying the location information of the external device 2000 upon receiving the start signal from the mobile device 1000.

In operation 1203, the electronic device 3000 may obtain information about noise characteristics of the mobile device 1000. According to an embodiment of the disclosure, the electronic device 3000 may obtain, from the mobile device 1000, the information about noise characteristics (e.g., frequency characteristics, level characteristics) of the noise generated when the mobile device 1000 moves.

In operation 1204, the electronic device 3000 may transmit, to the external device 2000, the information about noise characteristics of the mobile device, the information being received from the mobile device 1000. According to an embodiment of the disclosure, the information about noise characteristics may be used to extract the information about the noise of the mobile device 1000 from an audio signal detected by a microphone of the external device 2000 and correct the same.

In operation 1205, an audio signal including the noise of the mobile device 1000 may be generated through the microphone of the external device 2000. According to an embodiment of the disclosure, the external device 2000 may generate the audio signal in operation 1205 upon receiving the information about noise characteristics of the mobile device from the electronic device 3000.

In operation 1206, the external device 2000 may extract the information about the noise of the mobile device 1000 from the audio signal collected by the microphone, based on the information about noise characteristics. The information about the noise of the mobile device 1000 according to an embodiment of the disclosure may include information about noise levels for each time interval of the mobile device 1000, which are collected by the external device 2000.

In operation 1208, whenever a maximum value of a noise level of the mobile device 2000 is refined, the external device 2000 may transmit, to the electronic device 3000, information about noise, including the refined maximum value of the noise level.

The location information of the external device 2000 according to an embodiment of the disclosure may be identified based on a time point at which the noise level of the information about the noise of the mobile device 1000 is a maximum value. Accordingly, in a case where the electronic device 3000 periodically obtains the information about the noise of the mobile device 1000, when a maximum value of the noise level of the currently obtained information about the noise of the mobile device 1000 is lower than a maximum value of the noise level of the previously obtained information about the noise, the currently obtained information about the noise is unnecessary for the location information of the external device 2000 to be identified.

Thus, according to an embodiment of the disclosure, the electronic device 3000 may obtain the information about the noise, which includes the maximum value of the noise level, from the external device 2000 when the maximum value of the noise level of the mobile device 1000, which is obtained by the external device 2000, is refined instead of the information about the noise being periodically transmitted to the electronic device 3000. The electronic device 3000 according to an embodiment of the disclosure may identify the location information of the external device 2000, based on the refined maximum value of the noise level.

For example, whenever the maximum value of the noise level of the mobile device 1000, which is obtained by the external device 2000, is refined, the electronic device 3000 may receive information about the currently refined maximum value of the noise level from the external device 2000, and may identify location information of the mobile device 1000, based on the received information. In addition, the electronic device 3000 may identify the location information of the external device 2000, based on the identified location information of the mobile device 1000. Thus, according to an embodiment of the disclosure, whenever the maximum value of the noise level of the mobile device 1000 is refined, the electronic device 3000 may update the currently identified location information of the external device 2000.

In operation 1209, the electronic device 3000 may request the map information for identifying the location information of the mobile device 1000 from the mobile device 1000 upon receiving the information about the currently refined maximum value of the noise level from the external device 2000 in operation 1208. In operation 1210, the electronic device 3000 may receive the map information from the mobile device, according to the request of operation 1209.

In operation 1212, the electronic device 3000 may identify location information of the mobile device 1000, which corresponds to the time point at which the noise level is the maximum value, based on the map information received from the mobile device 1000 and the information about the currently refined maximum value of the noise level, the information being received from the external device 2000. In addition, in operation 1213, the electronic device 3000 may identify the location information of the external device 2000, based on the location information of the mobile device 1000, which is identified in operation 1212.

The electronic device 3000 according to an embodiment of the disclosure may continuously update the identified location information of the external device 2000 upon obtaining the map information and the information about the noise of the mobile device 1000 whenever the maximum value of the noise level is refined. According to an embodiment of the disclosure, when operations 1205 and 1213 included in 1208-1 are repeatedly performed until the movement of the mobile device 1000 is terminated, the location information of the external device 2000, which is identified by the electronic device 3000, may be continuously updated.

When the movement of the mobile device 1000 is terminated in operation 1214, the mobile device 1000 may transmit, to the electronic device 3000, a termination signal notifying that the movement is terminated in operation 1215.

According to an embodiment of the disclosure, when the movement of the mobile device 1000 is terminated, the electronic device 3000 may stop an operation of identifying the location information of the external device 2000. In addition, the electronic device 3000 may transmit, to the external device 2000, the termination signal notifying that the movement of the mobile device 1000 is terminated, to stop operations 1205, 1206, and 1208, which are repeatedly performed by the external device 2000.

According to an embodiment of the disclosure, without the need for a separate sound for identifying a location of an external device to be output, the location of the external device may be identified based on noise generated when a mobile device moves.

An embodiment of the disclosure may also be realized in a form of a recording medium including instructions executable by a computer, such as a program module executed by a computer. A non-transitory computer-readable recording medium may be an arbitrary available medium accessible by a computer, and examples thereof include all volatile and non-volatile media and separable and non-separable media. Further, examples of the non-transitory computer-readable recording medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes a computer-readable instruction, a data structure, or a program module, and includes an arbitrary information transmission medium.

Furthermore, in the disclosure, the term "unit" may be a hardware component such as a processor or circuit and/or a software component that is executed by a hardware component such as a processor.

The above description of the disclosure is provided for illustration, and it will be understood by those of ordinary skill in the art that various changes in form and details may be readily made therein without departing from essential features and the scope of the disclosure as defined by the following claims. Accordingly, the above embodiments of the disclosure are examples only in all aspects and are not limited. For example, each component described as a single type may be implemented in a distributed manner, and similarly, components described as distributed may be implemented in a combined form.

The scope of the disclosure includes all changes or modifications within the scope of the appended claims and their equivalents and will be understood as being included in the scope of the disclosure.

What is claimed is:

1. A method, performed by an electronic device, of identifying location information of an external device, the method comprising:
  obtaining map information including location information for each time interval of a mobile device based on the mobile device moving while generating noise near the external device;

obtaining audio signal information about an audio signal including the noise generated by the mobile device, the audio signal being collected by a microphone of the external device;

identifying, from the audio signal information, a time point at which a noise level of the noise generated by the mobile device is highest;

obtaining, from the map information, location information of the mobile device corresponding to the identified time point; and identifying the location information of the external device, based on the obtained location information of the mobile device.

2. The method of claim 1, wherein the noise level of the noise generated by the mobile device is obtained from the audio signal information using at least one of an artificial neural network or harmonic/percussive source separation (HPSS).

3. The method of claim 1, wherein the identifying of the location information of the external device comprises: correcting the location information of the external device based on a difference between a plurality of pieces of direction information of the mobile device obtained by the external device at at least two time points.

4. The method of claim 3, wherein the identifying of the location information of the external device comprises:
   identifying at least one candidate location based on the difference between the plurality of pieces of direction information;
   determining one location of the at least one candidate location based on noise levels of the noise generated by the mobile device at the at least two time points, the noise levels being collected by the microphone of the external device; and
   correcting the identified location information of the external device based on the determined one location.

5. The method of claim 1, wherein the identifying of the time point at which the noise level of the noise generated by the mobile device is highest comprises:
   extracting the noise level of the mobile device from the audio signal information;
   obtaining information about noise characteristics of the mobile device;
   correcting the noise level of the mobile device extracted from the audio signal information based on the obtained information; and
   identifying, from the audio signal information, the time point at which the noise level of the noise generated by the mobile device is highest, based on the corrected noise level.

6. The method of claim 1, wherein the map information and the audio signal information are periodically obtained by the electronic device, and the location information of the external device is periodically identified based on the obtained map information and the obtained audio signal information.

7. The method of claim 1, wherein the map information and the audio signal information are obtained by the electronic device based on a maximum value of the noise level of the noise generated by the mobile device being refined, and the location information of the external device is identified based on the maximum value being refined based on the obtained map information and the obtained audio signal information.

8. An electronic device configured to identify location information of an external device, the electronic device comprising:

a communicator comprising communication circuitry configured to obtain map information including location of a mobile device based on the mobile device moving while generating noise near the external device, and obtain audio signal information about an audio signal including the noise generated by the mobile device, the noise being collected by a microphone of the external device; and at least one processor configured to: identify, from the audio signal information, a time point at which a noise level of the noise generated by the mobile device is highest, obtain, from the map information, location information of the mobile device corresponding to the identified time point, and identify the location information of the external device based on the obtained location information of the mobile device.

9. The electronic device of claim 8, wherein the electronic device is configured to obtain noise generated by the mobile device from the audio signal information using at least one of an artificial neural network or harmonic/percussive source separation (HPSS).

10. The electronic device of claim 8, wherein the at least one processor is configured to: correct the location information of the external device based on a difference between a plurality of pieces of direction information of the mobile device obtained at at least two time points by the external device.

11. The electronic device of claim 10, wherein the at least one processor is configured to:
   identify at least one candidate location based on the difference between the plurality of pieces of direction information,
   determine one location from among the at least one candidate location based on noise levels of noise generated at the at least two time points by the mobile device, the noise levels being collected by the microphone of the external device, and
   correct the identified location information of the external device based on the determined one location.

12. The electronic device of claim 8, wherein the at least one processor is configured to:
   extract the noise level of the mobile device from the audio signal information,
   obtain information about noise characteristics of the mobile device,
   correct the noise level of the mobile device extracted from the audio signal information based on the obtained information, and
   identify, from the audio signal information, the time point at which the noise level of the noise generated by the mobile device is highest based on the corrected noise level.

13. The electronic device of claim 8, wherein the electronic device is configured to obtain the map information and the audio signal information periodically, and to identify the location information of the external device periodically based on the obtained map information and the obtained audio signal information.

14. The electronic device of claim 8, wherein the electronic device is configured to obtain map information and the audio signal information based on a maximum value of the noise level of the noise generated by the mobile device being refined, and to identify the location information of the external device based on the maximum value being refined based on the obtained map information and the obtained audio signal information.

15. A non-transitory computer-readable recording medium having recorded thereon a program for implementing the method of claim 1.

* * * * *